US008077551B2

(12) United States Patent
Fujisawa

(10) Patent No.: US 8,077,551 B2
(45) Date of Patent: Dec. 13, 2011

(54) TIME ADJUSTMENT DEVICE, TIMEKEEPING DEVICE WITH A TIME ADJUSTMENT DEVICE, AND A TIME ADJUSTMENT METHOD

(75) Inventor: Teruhiko Fujisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 722 days.

(21) Appl. No.: 12/176,037

(22) Filed: Jul. 18, 2008

(65) Prior Publication Data

US 2009/0034372 A1 Feb. 5, 2009

(30) Foreign Application Priority Data

Aug. 2, 2007 (JP) ................................ 2007-202085
Apr. 18, 2008 (JP) ................................ 2008-108618

(51) Int. Cl.
*G04C 11/02* (2006.01)
*G01S 19/08* (2010.01)

(52) U.S. Cl. .................................... 368/47; 342/357.45

(58) Field of Classification Search .................... 368/46, 368/47; 342/357.45, 357.63, 357.74
See application file for complete search history.

(56) References Cited

U.S. PATENT DOCUMENTS 5,883,594 A * 3/1999 Lau .......................... 342/357.63
6,212,133 B1 * 4/2001 McCoy et al. .................... 368/9
6,384,775 B1 * 5/2002 Chung ..................... 342/357.68
6,611,756 B1 * 8/2003 Chen et al. .................... 701/213
7,446,703 B2 * 11/2008 Park et al. ................ 342/357.43
2002/0053988 A1 * 5/2002 Chung ..................... 342/357.06
2002/0136094 A1 9/2002 Kawai
2003/0198140 A1 * 10/2003 Shimizu .......................... 368/47
2006/0250302 A1 * 11/2006 Park et al. .................. 342/357.1
2007/0063890 A1 * 3/2007 Yu ............................ 342/357.02
2007/0241959 A1 * 10/2007 Nakagawa ............... 342/357.06
2008/0025151 A1 * 1/2008 Urano et al. ..................... 368/14
2008/0025156 A1 * 1/2008 Urano et al. .................. 368/185
2008/0030403 A1 * 2/2008 Honda et al. ............. 342/357.01
2008/0074950 A1 * 3/2008 Rostrom ......................... 368/10

FOREIGN PATENT DOCUMENTS

| | | |
|---|---|---|
| CN | 1277683 A | 12/2000 |
| JP | 10-082875 | 3/1998 |
| JP | 11-125666 | 5/1999 |
| JP | 11-211858 | 8/1999 |

* cited by examiner

*Primary Examiner* — Vit Miska

(57) ABSTRACT

A time adjustment device having a time information generating unit that produces time information and outputs the generated time information; a reception unit that receives satellite signals transmitted sequentially from a positioning information satellite in subframe information units where a plurality of subframe information units each containing satellite-time-related information and at least one subframe information unit containing satellite health information is a unit, the satellite-time-related information is the time-related information of the positioning information satellite, and the satellite health information denotes an operating condition of the positioning information satellite; an external input unit that outputs command information instructing the reception unit to receive in response to external input; a reception timing configuration unit that sets the start time of reception by the reception unit so that the satellite signal is received immediately or at a predetermined timing based on command information from the external input unit; and a time adjustment information storage unit that stores the satellite-time-related information of the satellite signal received by the reception unit as time adjustment information. The generated time information is corrected based on the time adjustment information, and reception by the reception unit starts when the start timing comes.

9 Claims, 18 Drawing Sheets

TIME ADJUSTMENT DEVICE, TIMEKEEPING DEVICE WITH A TIME ADJUSTMENT DEVICE, AND A TIME ADJUSTMENT METHOD

CROSS-REFERENCE TO RELATED APPLICATIONS

Japanese Patent application No.(s) 2007-202085 and 2008-108618 are hereby incorporated by reference in their entirety.

BACKGROUND

1. Field of Invention

The present invention relates to a time adjustment device that corrects the time based on signals from a positioning information satellite such as a GPS satellite, to a timekeeping device that has the time adjustment device, and to a time adjustment method.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the GPS time) with extremely high precision.

Japanese Unexamined Patent Appl. Pub. JP-A-H11-211858 teaches a radio-controlled timepiece that analyzes the time code contained in a long-wave standard time signal to correct the displayed time instead of using GPS satellite signals or a method of correcting the time based on GPS time information.

The time information transmitted in a GPS satellite signal is updated on a predetermined cycle. Japanese Unexamined Patent Appl. Pub. JP-A-H11-125666 teaches technology for predicting the GPS time information after being updated at this predetermined period, predicting the time of the next GPS time signal, and using this predicted time to acquire the positioning information for the device location. Measuring the pseudo range to the GPS satellite and determining the current position is therefore possible even when the reception environment is not ideal.

Japanese Unexamined Patent Appl. Pub. JP-A-H10-82875 teaches a method of correcting the time using the time information (GPS time) from a GPS satellite.

This method acquires the navigation message at full power (that is, with the CPU running and other parts operating) immediately after the power is turned on. The time information contained in the acquired navigation message is then acquired and the time is calculated. The time is then calculated and the timing for the next correction is determined from the relationship between the precision of the crystal that generates the reference clock signal of the device and the required precision of the timepiece. More specifically, the time when the next navigation message will be acquired (when the CPU is stopped and a sleep mode is active) is determined. The navigation message is then acquired again after the sleep mode ends, and the time is corrected based on the time information acquired from the navigation message.

With this method the receiving device determines when to receive the GPS signal, such as immediately after the power turns on. The user, however, might also want to force adjusting the time based on the received GPS time. In such cases the reception time must be adjusted so that the GPS time can be received and the time can be adjusted at a time close to when the user wants to adjust the time. However, because minimizing power consumption is essential in a timepiece or other small device, it is also essential to acquire the information needed to set the time in the shortest time possible even when satellite signals are received from a GPS satellite or other positioning information satellite to adjust the time at a timing close to when the user wants to adjust the time.

SUMMARY OF INVENTION

A time adjustment device, a timekeeping device with the time adjustment device, and a time adjustment method according to preferred aspects of the present invention receive time data efficiently in a short time and enable correcting the time without greatly increasing the power consumption at a timing close to when the user wants to adjust the time.

A first aspect of the invention is a time adjustment device having a time information generating unit that produces time information and outputs the generated time information; a reception unit that receives satellite signals transmitted sequentially from a positioning information satellite in subframe information units where a plurality of subframe information units each containing satellite-time-related information and at least one subframe information unit containing satellite health information is a unit, the satellite-time-related information is the time-related information of the positioning information satellite, and the satellite health information denotes an operating condition of the positioning information satellite; an external input unit that outputs command information instructing the reception unit to receive in response to external input; a reception timing configuration unit that sets the start time of reception by the reception unit so that the satellite signal is received immediately or at a predetermined timing based on command information from the external input unit; and a time adjustment information storage unit that stores the satellite-time-related information of the satellite signal received by the reception unit as time adjustment information. The generated time information is corrected based on the time adjustment information, and reception by the reception unit starts when the start timing comes.

In this aspect of the invention the external input unit generates command information instructing the reception unit to receive in response to external input. The reception timing configuration unit sets the start time of reception by the reception unit so that the satellite signal is received immediately or at a predetermined timing based on command information from the external input unit. The reception unit then receives the satellite signal transmitted from a positioning information satellite. The satellite-time-related information in the satellite signal received by the reception unit is stored in the time adjustment information storage unit as the time adjustment information. The generated time information is then corrected based on the time adjustment information.

The generated time information is thus corrected based on the time adjustment information that is received when reception is initiated by input from the user, for example. The time adjustment device can therefore correct the generated time information at a timing close to the time when the user wants to set the time. Furthermore, because the time adjustment device starts reception in response to user input, power consumption can be reduced compared with when the time signal is received automatically at a regular interval.

Preferably, the positioning information satellite is a GPS satellite, the satellite signal transmission unit is the five subframe information units from subframe 1 to subframe 5, the satellite health information is contained in subframe 1, and the reception unit receives the satellite-time-related information and satellite health information in subframe 1.

In the time adjustment device according to this aspect of the invention the positioning information satellite is a GPS satellite, the satellite signal transmission unit is the five subframe information units from subframe 1 to subframe 5, the satellite health information is contained in subframe 1, and the reception unit receives the satellite-time-related information and satellite health information in subframe 1.

By thus receiving the first subframe, subframe 1, in the subframe information unit, the time adjustment device according to this aspect of the invention can receive the satellite-time-related information and the satellite health information and adjust the time. The time adjustment device therefore completes reception within a short time and can thereby reduce power consumption.

In a time adjustment device according to another aspect of the invention the reception unit has a decision unit that determines if the received satellite-time-related information is correct, and the time adjustment information is the satellite-time-related information determined by the decision unit to be correct.

The time adjustment device according to this aspect of the invention uses the satellite-time-related information determined to be correct by the decision unit, which determines if the received satellite-time-related information is correct, as the time adjustment information. Because the time adjustment device thus corrects the time based on satellite-time-related information that is determined to be reliable, the time can be corrected accurately.

In a time adjustment device according to another aspect of the invention, if the current time adjustment, which is the amount the generated time information was corrected based on the time adjustment information, exceeds a threshold value offset, which is an offset time corresponding to the time passed from the generated time information the last time the generated time information was corrected, the reception unit receives the satellite-time-related information in a plural number of following subframe information units, and stores the satellite-time-related information in the received plural number of following subframe information units as the satellite time information for the respective subframe information units. Any one of at least two satellite time information values for which the difference therebetween matches the difference between the subframe information units containing the at least two satellite time information values is then selected, and the generated time information is corrected based on the selected satellite time information.

In the time adjustment device according to this aspect of the invention the reception unit receives the satellite-time-related information in a plural number of following subframe information units, and stores the received satellite-time-related information as the satellite time information for the respective subframe information units if the amount the generated time information was corrected based on the time adjustment information exceeds a threshold value offset. The time adjustment device then selects any one of at least two satellite time information values for which the difference therebetween matches the difference between the subframe information units containing the at least two satellite time information values, and corrects the generated time information based on the selected satellite time information.

The time adjustment device thus avoids using inaccurate time adjustment information to correct the generated time information, and can therefore suppress further deviation in the corrected generated time information.

In a time adjustment device according to another aspect of the invention, subframe 1 to subframe 5 each contain a subframe ID number; the reception unit starts reception immediately when a receive command is asserted by the external input unit if the start timing of reception by the reception unit is set to start reception immediately; the reception timing configuration unit sets the start timing for receiving the next subframe 1 based on the subframe ID number of the first subframe received by the reception unit, pauses reception by the reception unit until the start timing for reception of the next subframe 1 arrives, and resumes reception by the reception unit when the start timing for reception of the next subframe 1 arrives; and the reception unit thereby receives the satellite-time-related information and satellite health information from the next subframe 1.

In the time adjustment device according to this aspect of the invention subframe 1 to subframe 5 each contain a subframe ID number, and the reception unit starts reception immediately when a receive command is asserted by the external input unit if the start timing of reception by the reception unit is set to start reception immediately. Based on the subframe ID number of the first subframe received by the reception unit, the reception timing configuration unit then sets the timing for starting to receive the next subframe 1, pauses reception by the reception unit until the start timing for reception of the next subframe 1 arrives, and resumes reception by the reception unit when the start timing for reception of the next subframe 1 arrives. The reception unit thereby receives the satellite-time-related information and satellite health information from the next subframe 1.

By thus temporarily stopping reception by the reception unit, the time adjustment device according to this aspect of the invention receives the desired signals efficiently and can therefore reduce power consumption.

In a time adjustment device according to another aspect of the invention, there is a plurality of positioning information satellites, the reception unit has a condition evaluation unit that determines the operating condition of the positioning information satellite based on the satellite health information, and the reception unit receives the satellite signal from a different positioning information satellite based on the result output by the condition evaluation unit.

In this aspect of the invention there is a plurality of positioning information satellites, the reception unit of the time adjustment device has a condition evaluation unit that determines the operating condition of the positioning information satellite based on the satellite health information, and the reception unit receives the satellite signal from a different positioning information satellite based on the result output by the condition evaluation unit.

If the operating condition of the positioning information satellite is not normal, the time adjustment device in this aspect of the invention receives the satellite signal from a different positioning information satellite, and can thereby accurately correct the time.

In a time adjustment device according to another aspect of the invention, if the time passed to the present since the last time the satellite health information was received is greater than or equal to a predetermined time, the reception unit receives subframe 1 as the subframe information unit containing the satellite-time-related information and satellite health information.

In the time adjustment device according to this aspect of the invention if the time passed since the last time the satellite health information was received to the present is greater than or equal to a predetermined time, the reception unit receives subframe 1 containing the satellite-time-related information and satellite health information.

By thus receiving subframe 1 if the time passed since the last time the satellite health information was received to the present is greater than or equal to a predetermined time, the time adjustment device can confirm the operating condition of the positioning information satellite from the satellite health information. The time adjustment device can therefore determine the reliability of the satellite-time-related information and thereby accurately correct the time.

Another aspect of the invention is a timekeeping device with a time adjustment device having a time information generating unit that produces time information and outputs the generated time information; a reception unit that receives satellite signals transmitted sequentially from a positioning information satellite in subframe information units where a plurality of subframe information units each containing satellite-time-related information and at least one subframe information unit containing satellite health information is a unit, the satellite-time-related information is the time-related information of the positioning information satellite, and the satellite health information denotes an operating condition of the positioning information satellite; an external input unit that outputs command information instructing the reception unit to receive in response to external input; a reception timing configuration unit that sets the start time of reception by the reception unit so that the satellite signal is received immediately or at a predetermined timing based on command information from the external input unit; and a time adjustment information storage unit that stores the satellite-time-related information of the satellite signal received by the reception unit as time adjustment information. The generated time information is corrected based on the time adjustment information, and reception by the reception unit starts when the start timing comes.

Another aspect of the invention is a time adjustment method including a time information generating unit that produces time information and outputs the generated time information; a reception unit that receives satellite signals transmitted sequentially from a positioning information satellite in subframe information units where a plurality of subframe information units each containing satellite-time-related information and at least one subframe information unit containing satellite health information is a unit, the satellite-time-related information is the time-related information of the positioning information satellite, and the satellite health information denotes an operating condition of the positioning information satellite; an external input step that outputs command information instructing the reception unit to receive in response to external input; a reception timing configuration step that sets the start time of reception by the reception unit so that the satellite signal is received immediately or at a predetermined timing based on command information from the external input unit; a step that starts reception by the reception unit from the moment the start timing arrives; a time adjustment information storage step that stores the satellite-time-related information of the satellite signal received by the reception unit as time adjustment information; and a step that corrects the generated time information based on the time adjustment information.

DESCRIPTION OF THE PREFERRED EMBODIMENTS

Preferred embodiments of a time adjustment device, a timekeeping device with a time adjustment device, and a time adjustment method according to the present invention are described below with reference to the accompanying figures.

Embodiment 1

Figure 1:
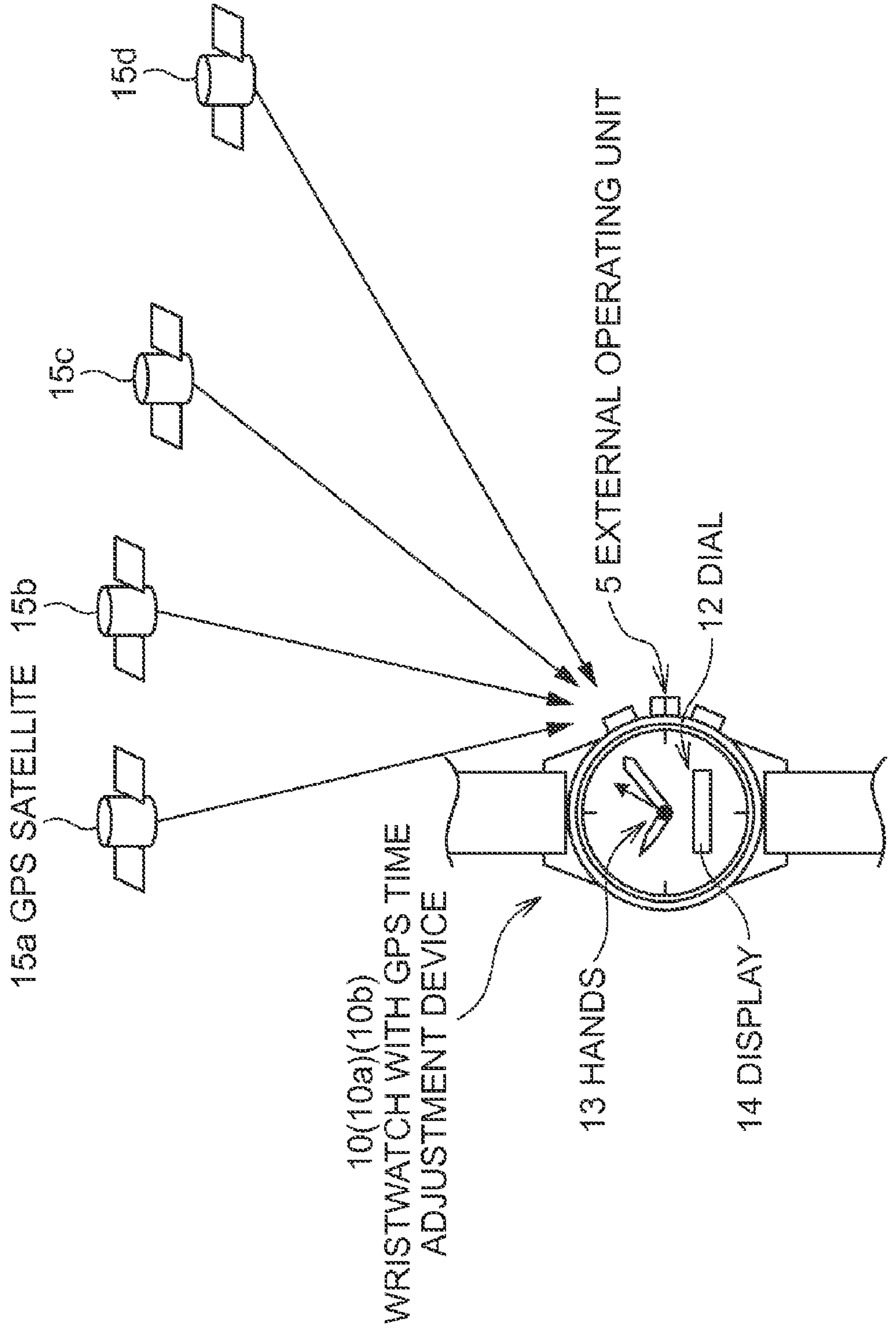
FIG. 1 is a schematic diagram showing a GPS wristwatch according to a first embodiment of the invention.
Figure 2:
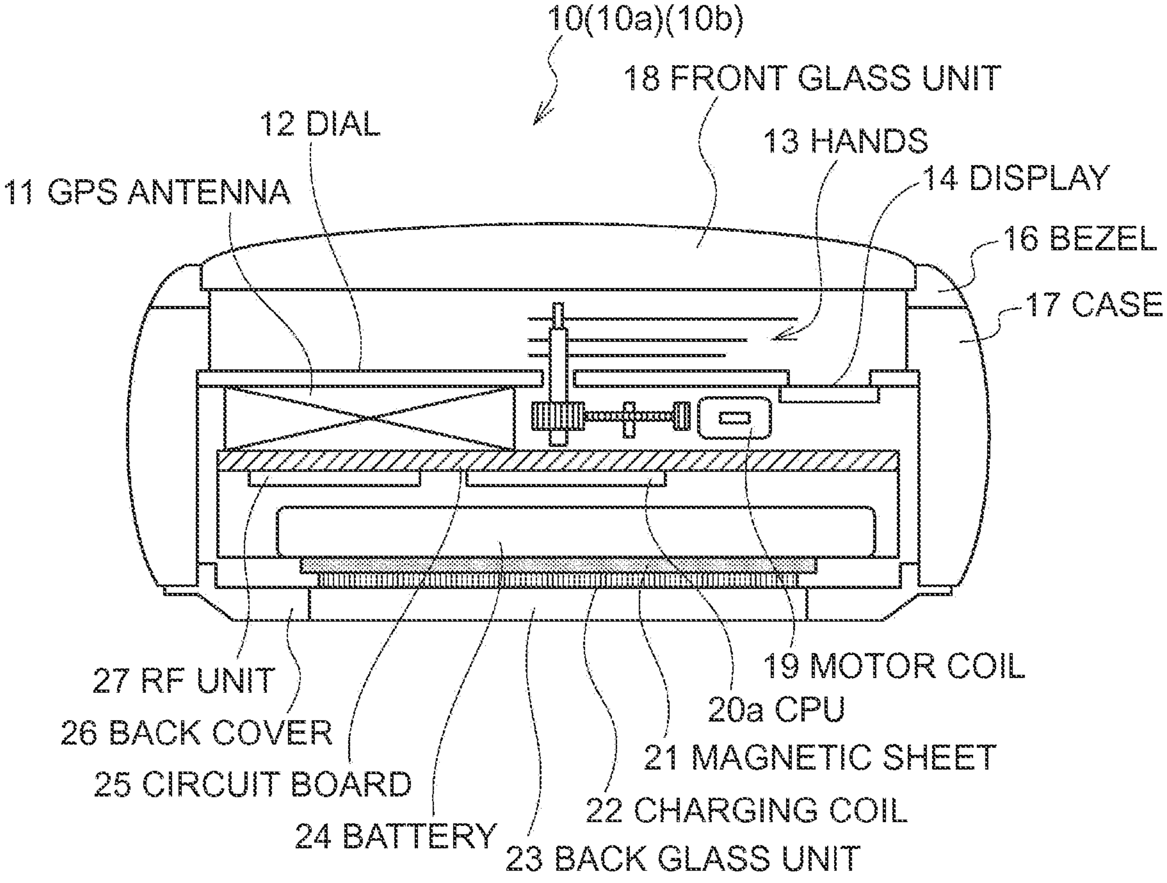
FIG. 2 is a section view of the GPS wristwatch shown in FIG. 1.
Figure 3:
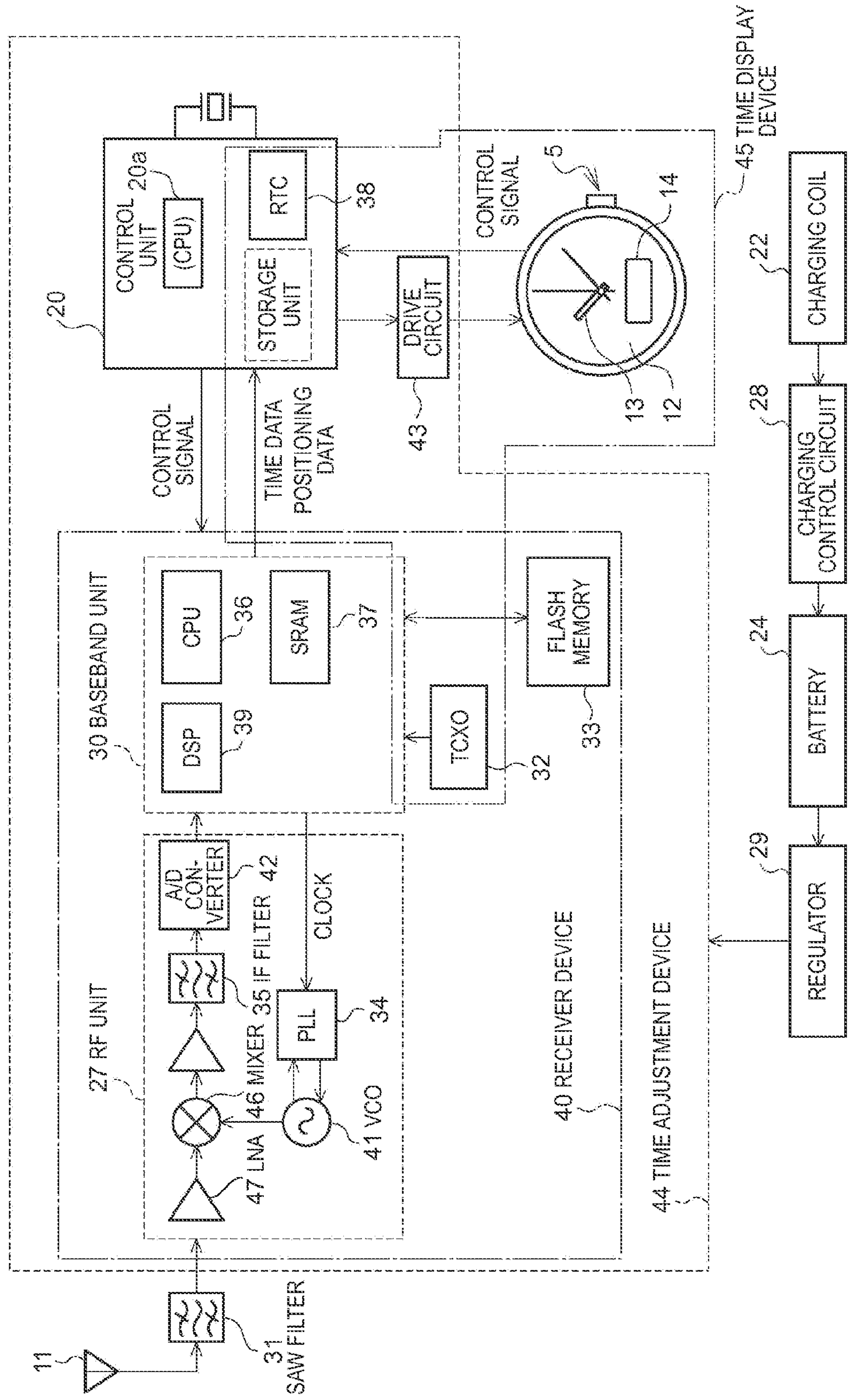
FIG. 3 is a block diagram showing the main internal hardware configuration of the GPS wristwatch according to the first embodiment of the invention.

FIG. 1 is a schematic diagram showing a wristwatch with a GPS time adjustment device 10 (referred to below as a GPS wristwatch 10) as an example of a timekeeping device with a time adjustment device according to a first embodiment of the present invention. FIG. 2 is a section view of the GPS wristwatch 10 shown in FIG. 1. FIG. 3 is a block diagram showing the main internal hardware configuration of the GPS wristwatch 10 shown in FIG. 1 and FIG. 2.

As shown in FIG. 1 and FIG. 2, the GPS wristwatch 10 has a time display unit and a display 14 on the front. The time display unit includes a dial 12 and hands 13 such as the second hand, minute hand, and hour hand. The display 14 in this aspect of the invention is an LCD panel used for presenting location information such as the latitude and longitude or the city name, as well as other informational messages. The hands 13 are driven through a wheel train by means of a stepping motor that includes a motor coil 19.

As shown in FIG. 1, the GPS wristwatch 10 also has an external operating unit 5 for externally inputting reception commands, for example, to the GPS wristwatch 10. More particularly, in this embodiment of the invention the user can use the external operating unit 5 to enter a command to receive time signals from a GPS satellite 15*a* (or satellites 15*b* to 15*d*) and adjust the time.

As shown in FIG. 2, the GPS wristwatch 10 has a GPS antenna 11. The GPS antenna 11 is a part of the receiver device 40 (see FIG. 3). This GPS antenna 11 is a patch antenna for receiving satellite signals from a plurality of GPS satellites 15*a* to 15*d* orbiting the Earth on fixed orbits in space. This GPS antenna 11 is located on the opposite side of the dial 12 as the side on which the time is displayed. The dial 12 is made of plastic or other material that passes RF signals such as the signals transmitted from the GPS satellites 15*a* to 15*d*.

The GPS satellites 15*a* to 15*d* are an example of a positioning information satellite, and a plurality of GPS satellites 15*a* to 15*d* orbit the Earth in space. In this embodiment of the invention satellite signals are received from the GPS satellite 15*a* (or 15*d* to 15*d*) located where signals can currently be most easily received. Note that four GPS satellites 15*a* to 15*d* are shown in FIG. 1 by way of example, and the number of GPS satellites is not so limited.

The outside case 17 is made of stainless steel, titanium, or other metal. The bezel 16 is preferably ceramic in order to improve the reception performance of the GPS antenna 11 that receives satellite signals from the GPS satellites 15*a* (15*b* to 15*d*). The crystal 18 (front glass unit) is fit into the bezel 16.

The battery 24 is a lithium-ion battery or other type of storage battery. A magnetic sheet 21 is disposed below the battery 24, and a charging coil 22 is disposed with the magnetic sheet 21 between it and the battery 24. The battery 24 can therefore be charged by the charging coil 22 by means of electromagnetic induction from an external charger.

The magnetic sheet 21 can also divert the magnetic field. The magnetic sheet 21 therefore reduces the effect of the battery 24 and enables the efficient transmission of energy. A back glass unit 23 is also disposed in the center part of the back cover 26 to facilitate power transmission.

The GPS wristwatch 10 is arranged as described above.

As shown in FIG. 3, the GPS wristwatch 10 also has a time display device 45, a receiver device 40, and a time adjustment device 44, and functions as a computer. The configuration shown in FIG. 3 is further described below.

As shown in FIG. 3, the GPS wristwatch 10 has a receiver device 40 and passes satellite signals received from a GPS satellite 15*a* (15*b* to 15*d*) in FIG. 1 from the GPS antenna 11 through a filter (SAW) 31 and RF (radio frequency) unit 27 to extract the signal by means of the baseband unit 30.

More specifically, the filter (SAW) 31 is a bandpass filter and in this embodiment of the invention extracts a 1.5-GHz satellite signal. The extracted satellite signal is amplified by an LNA 47, mixed by a mixer 46 with a signal supplied from a VCO 41, and down-converted to an IF (intermediate frequency) signal. The clock signal for the PLL 34 is generated by a temperature-compensated crystal oscillator (TCXO) 32.

The satellite signal passes the IF filter 35 and IF amplifier, and is converted to a digital signal by the A/D converter 42. The baseband unit 30 then processes the satellite signal based on a control signal. The time data output by the baseband unit 30 is stored in a storage unit, and the corrected time information is displayed by means of a drive circuit 43.

The receiver device 40 includes an RF unit 27 and baseband unit 30. The RF unit 27 includes a PLL 34, IF filter 35, VCO 41, A/D converter 42 and LNA 47.

The receiver device 40 that includes the GPS antenna 11 and filter (SAW) 31 is an example of a reception unit, and is also referred to an a GPS device. The receiver device 40 including the GPS antenna 11 and filter (SAW) 31 is referred to below as simply the receiver device 40.

The baseband unit 30 also includes a digital signal processor (DSP) 39, a CPU (central processing unit) 36, and SRAM (static random access memory) 37, and is connected to the temperature-compensated crystal oscillator (TCXO) 32 and flash memory 33.

A real-time clock (RTC) 38 is disposed to the control unit 20. The real-time clock 38 counts up at a reference clock that is determined by a crystal oscillator connected to the control unit 20. The control unit 20 includes a CPU 20*a*.

The charging coil 22 charges the battery 24, which is a storage battery, with power through a charging control circuit 28, and supplies drive power from the battery 24 to the time adjustment device 44 and other parts through a regulator 29. The control unit 20 also outputs a control signal to the receiver device 40.

The GPS wristwatch 10 controls the reception operation of the receiver device 40 by means of the control unit 20.

The GPS wristwatch 10 according to this embodiment of the invention is thus an electronic timepiece. The real-time clock 38 is an example of a time information generating unit for generating time information. The internal time data 73*b* (see FIG. 7) that is the time information generated by the real-time clock 38 is an example of generated time information. The receiver device 40 is an example of a reception unit.

Figure 4:
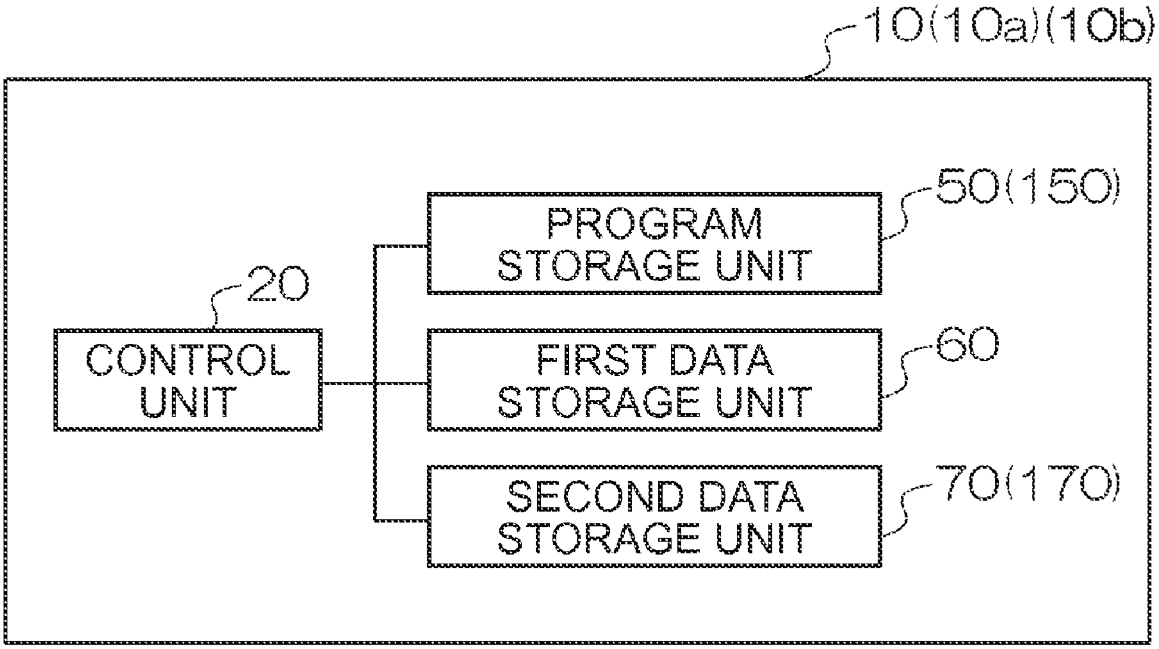
FIG. 4 is a schematic diagram showing the main software configuration of the GPS wristwatch according to the first embodiment of the invention.

FIG. 4 to FIG. 7 schematically describe the main software structure of the GPS wristwatch 10, FIG. 4 being an overview.

As shown in FIG. 4, the control unit 20 of the GPS wristwatch 10 runs programs stored in the program storage unit 50 in FIG. 4, and processes data stored in the first data storage unit 60 and data stored in the second data storage unit 70.

Figure 5:
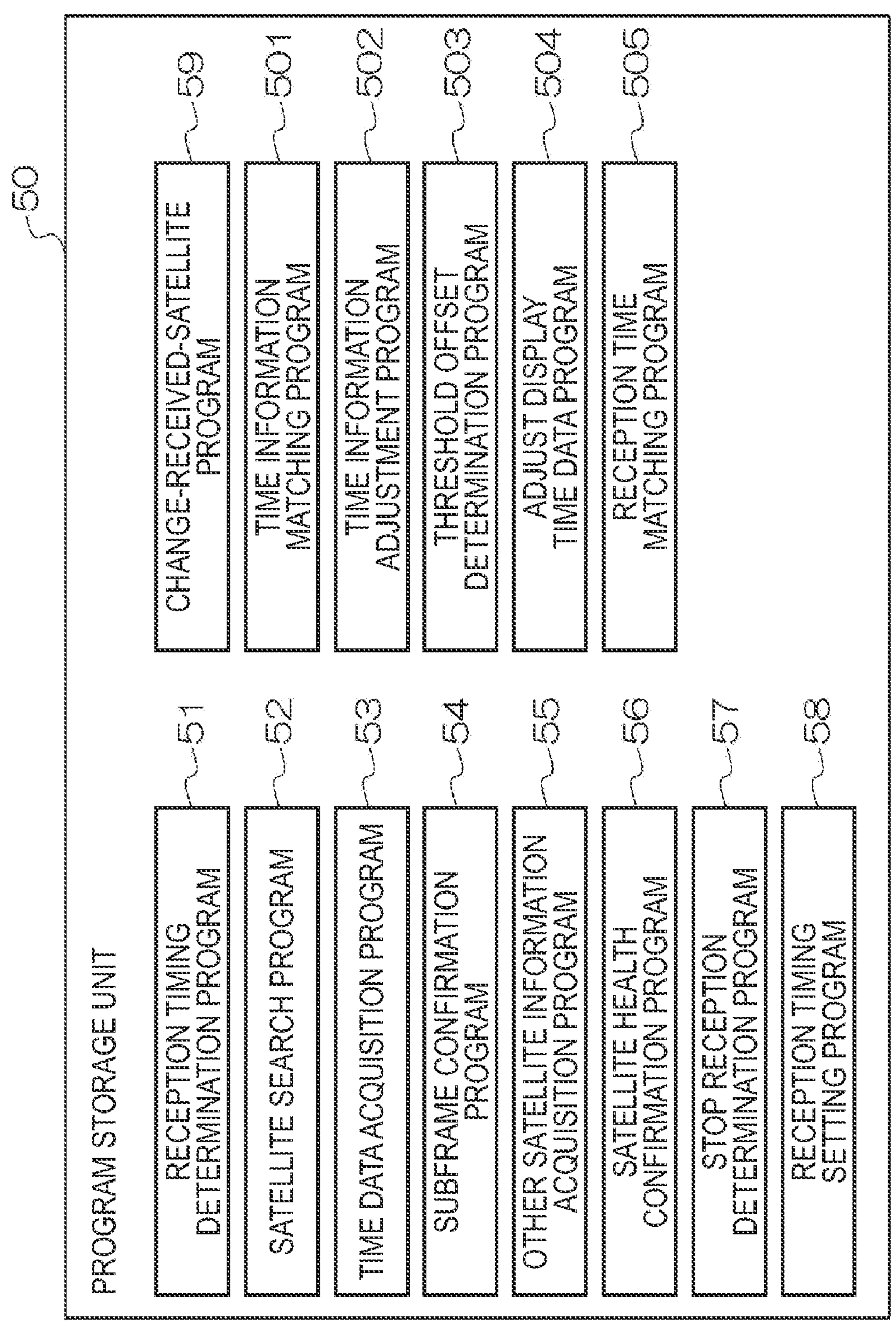
FIG. 5 shows data stored in the program storage unit shown in FIG. 4.
Figure 6:
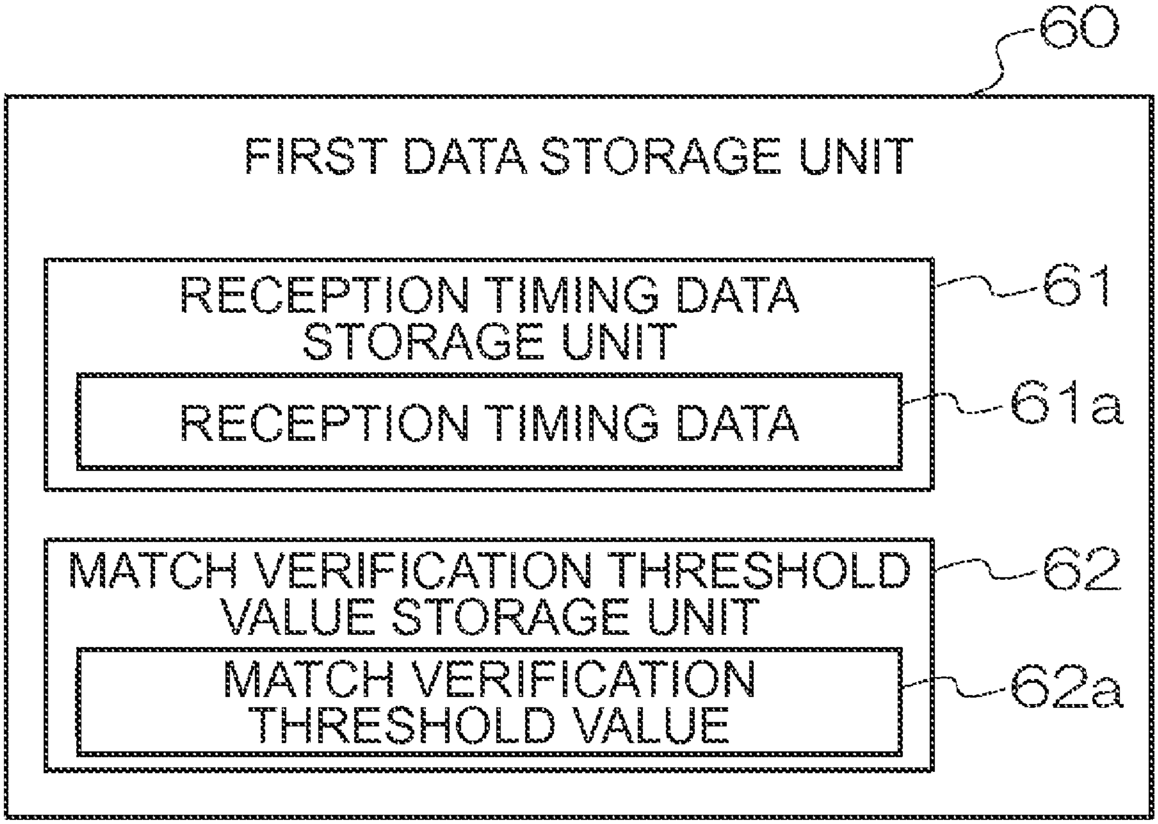
FIG. 6 shows data stored in the first data storage unit shown in FIG. 4.
Figure 7:
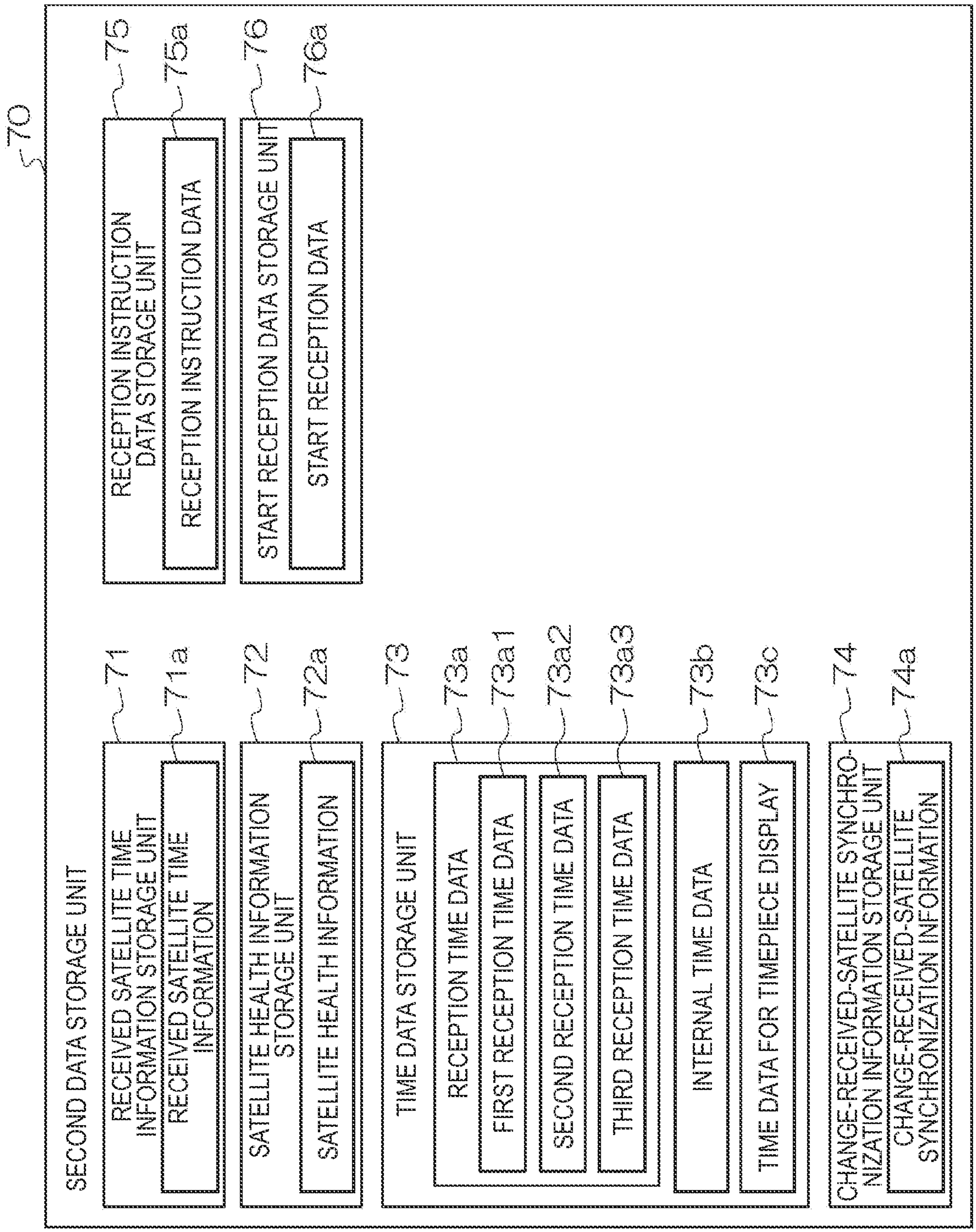
FIG. 7 shows data stored in the second data storage unit shown in FIG. 4.

FIG. 5 shows the data stored in the program storage unit 50 in FIG. 4. FIG. 6 shows the data stored in the first data storage unit 60 in FIG. 4. FIG. 7 shows the data stored in the second data storage unit 70 in FIG. 4.

The first data storage unit 60 in FIG. 6 stores primarily previously stored data, and the second data storage unit 70 in FIG. 7 stores primarily data resulting from processing the data in the first data storage unit 60 by means of a program stored in the program storage unit 50.

Figure 8:
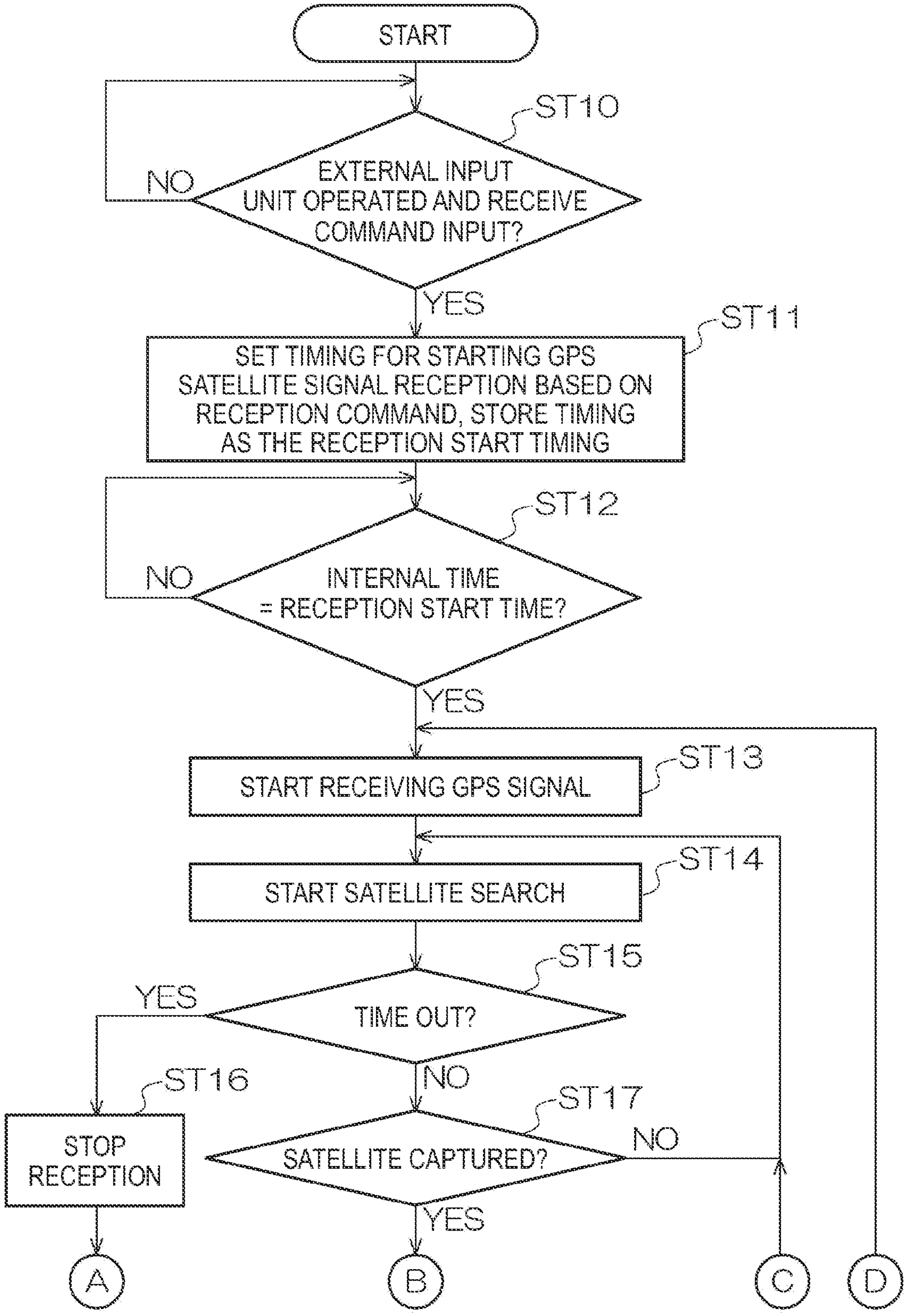
FIG. 8 is a flow chart showing the main steps in the operation of the GPS wristwatch according to the first embodiment of the invention.
Figure 9:
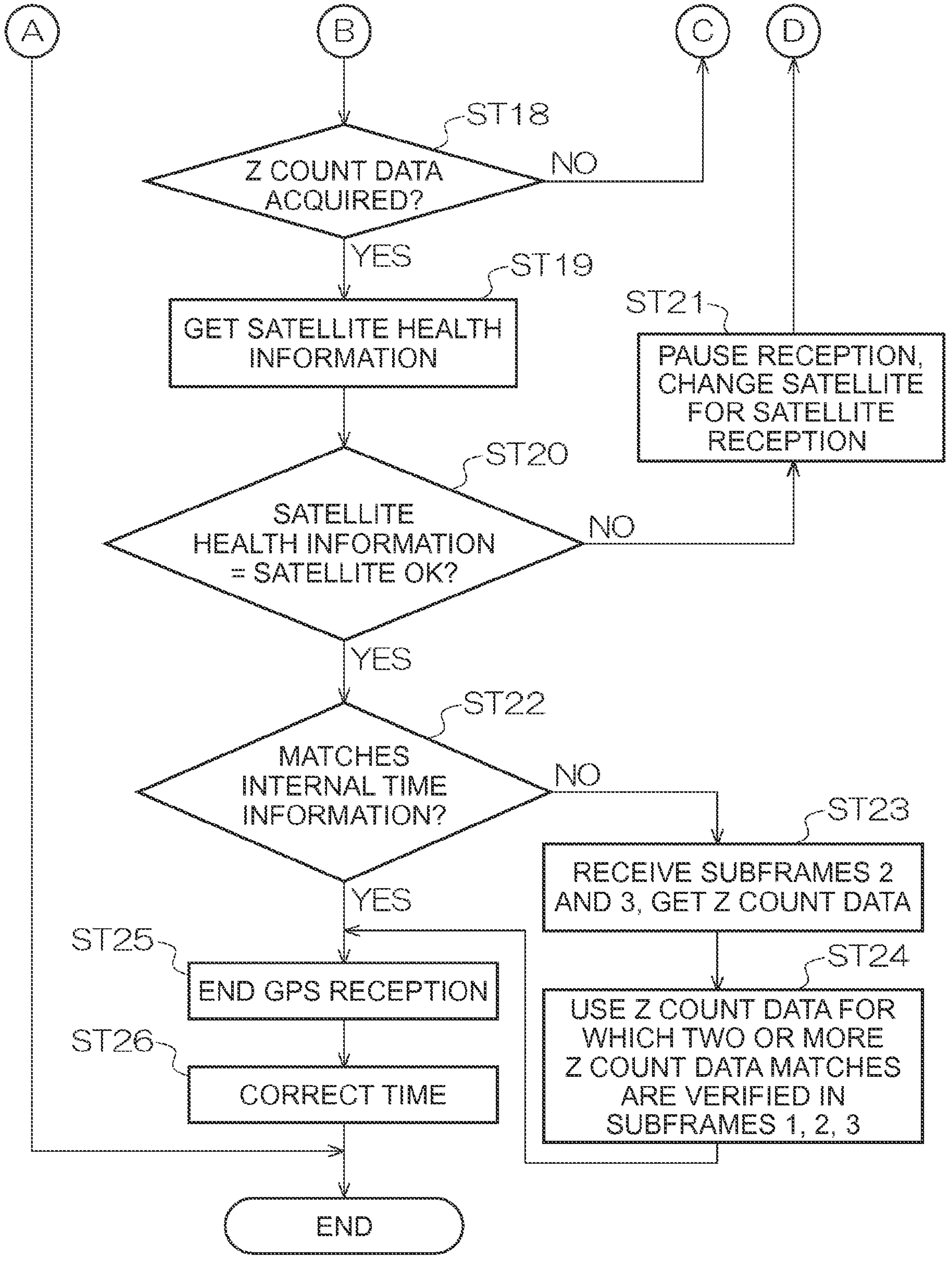
FIG. 9 is a flow chart showing the main steps in the operation of the GPS wristwatch according to the first embodiment of the invention.

FIG. 8 and FIG. 9 are flow charts describing the main steps in the operation of the GPS wristwatch 10 according to this embodiment of the invention.

The programs and data shown in FIG. 5 to FIG. 7 are described below while describing the operation of the GPS wristwatch 10 according to this embodiment of the invention with reference to the flow charts in FIG. 8 and FIG. 9.

First, as shown in FIG. 7, whether the external operating unit 5 (an example of an external input unit) was operated and a reception command was asserted is determined in step ST10. More specifically, if the user wants to receive the satellite signal from the GPS satellites 15*a* (15*b* to 15*d*) to adjust the time displayed by the hands 13, for example, the user operates the external operating unit 5 and inputs a command to receive a GPS satellite 15*a* (15*b* to 15*d*) signal.

The reception command input from the external operating unit 5 is stored as the reception instruction data 75*a* in the reception instruction data storage unit 75 shown in FIG. 7. The operating signal confirmation program 54 in FIG. 5 checks the reception instruction data storage unit 75 in FIG. 7 and determines if the reception instruction data 75*a* is stored.

If it is confirmed in step ST10 that the reception instruction data 75*a* is stored in the reception instruction data storage unit 75 in FIG. 7, control goes to step ST11.

The timing for starting to receive signals from a GPS satellite 15*a* (15*b* to 15*d*) is set in step ST11 based on the reception instruction data 75*a*, and is stored as the time-to-start-reception data. More specifically, the start-reception data configuration program 58 in FIG. 5 (an example of a start-reception data configuration unit) confirms the time that the reception instruction data 75*a* in FIG. 7 was stored based on the internal time data 73*b* in FIG. 7. The start-reception data configuration program 58 then generates the start reception data 76*a* based on the reception timing data 61*a* stored in the reception timing data storage unit 61 in FIG. 6.

The start-reception data configuration program 58 in FIG. 5 generates and stores the start reception data 76*a* in the start reception data storage unit 76 so that the internal time data 73*b* in FIG. 7 is corrected at the 0 second or 30 second of the minute closest to the time of the reception instruction data 75*a*.

More specifically, if the time when the user operates the external operating unit 5 to input the GPS satellite 15*a* (15*b* to 15*d*) signal reception command and the reception instruction data 75*a* is stored is between 07:00:21 and 07:00:49, a time between 07:00:50 to 07:00:58 is stored as the start reception data 76*a* depending on the GPS satellite 15*a* (15*b* to 15*d*) search time. Signal reception is then set to start when the internal time data 73*b* goes to 07:01:00.

If the time of the reception instruction data 75*a* is between 07:00:51and 07:01:19, a time between 07:01:20 to 07:01:28 is stored as the start reception data 76*a*. Signal reception is then set to start when the internal time data 73*b* goes to 07:01:30.

The reception instruction data 75*a* is thus set so that the internal time data 73*b* is corrected at a predetermined time at the 0 second or 30 second of the minute.

The start reception data 76*a* is thus set to a time before transmission of subframe 1 (an example of a subframe information unit) of the GPS satellite 15*a* (15*b* to 15*d*) signal starts as further described below.

In addition to the GPS satellite 15*a* (15*b* to 15*d*) search time, the start reception data 76*a* is also set with consideration for the startup time of the RF unit 27 of the receiver device 40. As a result, the start reception data 76*a* is set to start searching for a GPS satellite 15*a* (15*b* to 15*d*) approximately 2-10 seconds before transmission of subframe 1 starts.

Control then goes to step ST12. In step ST12 the internal time data 73*b* in FIG. 7 is referenced to determine if it is the time indicated by the start reception data 76*a*. More specifically, the reception timing determination program 51 in FIG. 5 reads and determines if the internal time data 73*b* in FIG. 7 equals the start reception data 76*a* in FIG. 7. For example, because the start reception data 76*a* in this example is a time from 07:01:20-07:01:28, whether the time denoted by the internal time data 73*b* has reached 07:01:20-07:01:28 is confirmed.

If the time denoted by the internal time data 73*b* does not equal the start reception data 76*a*, the start of reception waits until the time based on the internal time data 73*b* reaches the start reception data 76*a*.

When time based on the internal time data 73*b* reaches the start reception data 76*a*, control goes to step ST13. Receiving signals from the GPS satellite 15*a* (15*b* to 15*d*) then starts in step ST13. The receiver device 40 therefore starts to prepare for searching for a GPS satellite 15*a* (15*b* to 15*d*).

More specifically, the receiver device 40 starts operating and generates the C/A code pattern for a particular GPS satellite 15*a* (15*b* to 15*d*) in order to receive the satellite signal through the GPS antenna 11.

Control then goes to step ST14 and the GPS satellite search starts. More particularly, the satellite search program 52 in FIG. 5 causes the receiver device 40 to adjust the output timing of the C/A code pattern for a particular GPS satellite 15*a* (15*b* to 15*d*) and searches for a GPS satellite 15*a* (15*b* to 15*d*) signal with which the receiver device 40 can synchronize.

Note that the amount of time needed to locate a GPS satellite 15*a* (15*b* to 15*d*) depends partly upon whether or not orbit information for the GPS satellites 15*a* to 15*d* is stored locally. Searching requires several seconds if operating from a cold start with no locally stored orbit information.

The GPS wristwatch 10 determines the time when the satellite search starts according to whether or not there is locally stored orbit information so that the subframe 1 data can be reliably received.

Proceeding to step ST15, the receiver device 40 adjusts the timing at which the receiver device 40 generates the C/A code of the GPS satellite 15*a* (15*b* to 15*d*), and determines if the time until synchronization is possible is greater than or equal to a prescribed time.

More specifically, the stop reception determination program 57 in FIG. 5 counts the time from the start of reception, and determines if the time required to find a GPS satellite 15*a* (15*b* to 15*d*) exceeds a predetermined time. If this predetermined time or longer has passed, operation times out, control goes to step ST16, and reception ends.

As a result, if the GPS wristwatch 10 is located where the GPS satellite 15*a* (15*b* to 15*d*) signal cannot be received, such as indoors, and the receiver device 40 is driven for a long time in order locate a satellite, a large amount of power will be consumed. The GPS wristwatch 10 according to this embodiment of the invention therefore terminates reception when a predetermined time has passed in order to avoid needlessly consuming power.

If operation has not timed out in step ST15, control goes to step ST17.

Step ST17 determines if a GPS satellite 15*a* (15*b* to 15*d*) was captured. More specifically, the satellite search program 52 in FIG. 5 causes the receiver device 40 to search for and synchronize with a GPS satellite 15*a* (15*b* to 15*d*). The satellite search program 52 then determines of the navigation message that is an example of a satellite signal from the GPS satellite 15*a* (15*b* to 15*d*) as described below can be decoded.

If a GPS satellite 15*a* (15*b* to 15*d*) cannot be captured, the procedure loops to step ST14 and the GPS satellite 15*a* (15*b* to 15*d*) search repeats to find a different GPS satellite 15*a* (15*b* to 15*d*).

If a GPS satellite 15*a* (15*b* to 15*d*) is captured, control goes to step ST18 in FIG. 9 to acquire the navigation message from the satellite signal.

Before proceeding to step ST18, the navigation message carried by the signal (satellite signal) transmitted from the GPS satellite 15*a* (15*b* to 15*d*) is described below.

FIG. 10 schematically describes the navigation message.

Figure 10A:
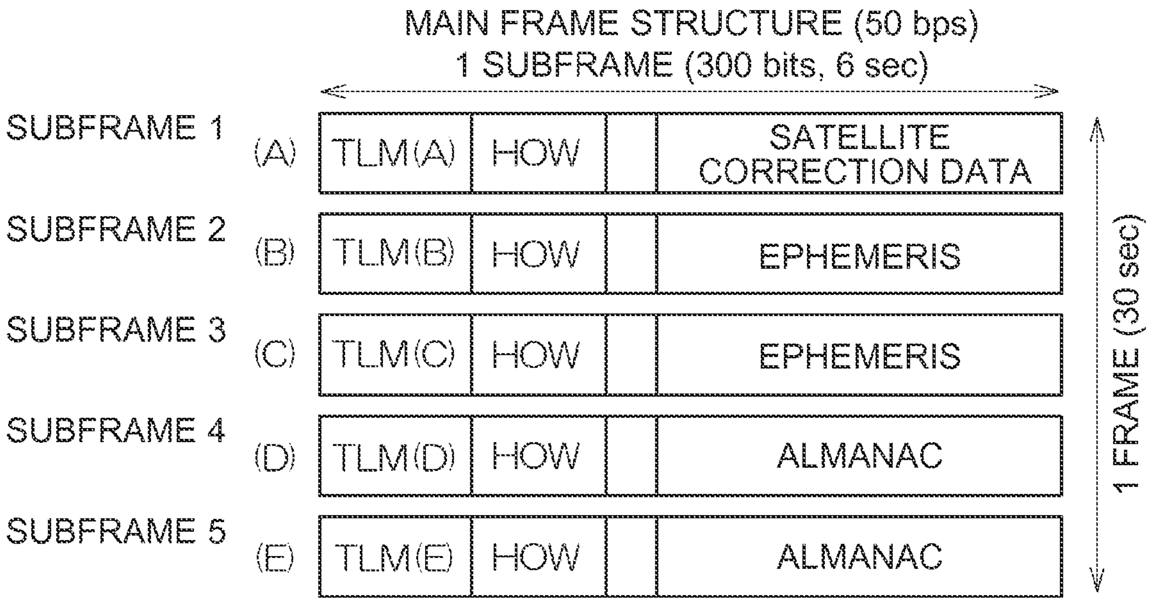
FIGS. 10A and 10B show the structure of the navigation message.

As shown in FIG. 10A, signals are transmitted from each of the GPS satellite 15*a* (15*b* to 15*d*) in units of one frame every 30 seconds. One frame contains five subframes (subframe 1 to subframe 5). Each subframe is 6 seconds long, and contains 10 words (each word is 0.6 second).

Figure 10B:
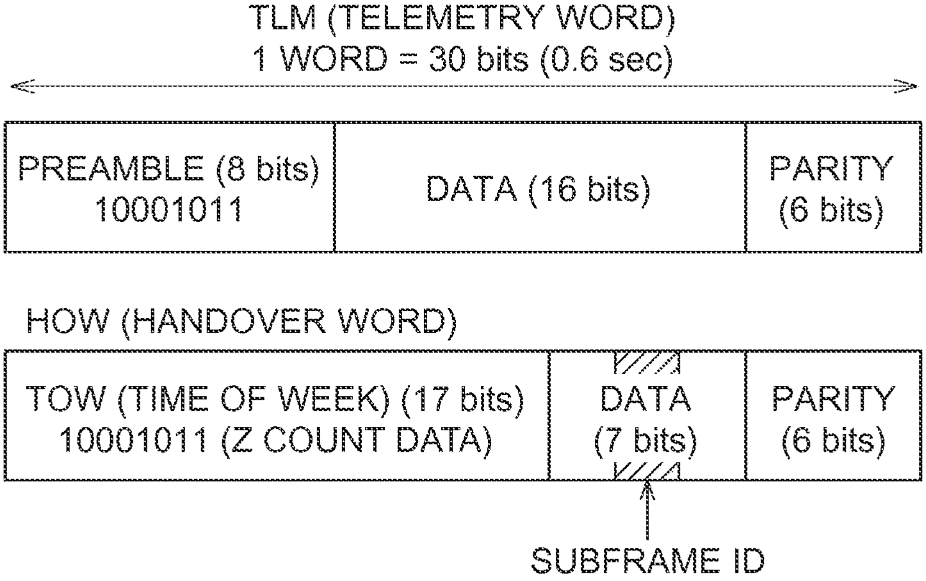

The first word in each subframe is a telemetry (TLM) word storing the TLM data, and each TLM word starts with a preamble as shown in FIG. 10B.

The TLM word is followed by a handover word HOW storing the HOW (handover) data, and each HOW starts with the time of week (TOW) (also called the Z count) indicating the GPS time information of the GPS satellite.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. The GPS time is also called the Z count (referred to below as the Z count data), is an example of satellite-time-related information, and enables the receiver device 40 to know the current time.

The same GPS week number is added to the GPS time throughout the week, and is contained as the week number data in the navigation message or satellite signal from the GPS satellite.

The starting point for the GPS time information is 00:00:00 of Jan. 6, 1980 referenced to the Coordinated Universal Time (UTC), and the week that started on that day is week 0. The GPS receiver can therefore get the precise GPS time from the week number and the elapsed time (number of seconds) (Z count data).

The week number is updated once a week.

Therefore, if the receiver device 40 has already acquired the week number and has counted the time passed since the week number data was acquired, the current week number of the GPS satellite 15*a* (15*b* to 15*d*) can be known from the acquired week number and the Z count data without acquiring the week number data again. By therefore normally acquiring only the Z count data, the reception operation of the GPS wristwatch 10 can be completed in a short time and power consumption can be reduced.

As shown in FIG. 10B, the subframe ID data, which is the subframe number, is contained in the word following the Z count data in the HOW word. The subframe ID data enables the GPS wristwatch 10 to know from which of subframes 1 to 5 the received subframe data was read.

As shown in FIG. 10, the main frame of the navigation message contained in the signal from the GPS satellite 15 contains 1500 bits and is transmitted at 50 bps.

The main frame is divided into five subframes of 300 bits each (see FIG. 10A). Subframe 1 to subframe 5 therefore contain the TLM word and the Z count (TOW) data in the HOW word.

In addition to the TLM word and HOW, the navigation message also includes the ephemeris (detailed orbit information for the transmitting GPS satellite 15*a* (15*b* to 15*d*)), almanac (orbit information for all GPS satellites 15*a* to 15*d*), and the UTC data (universal time, coordinated) not shown.

Figure 11:
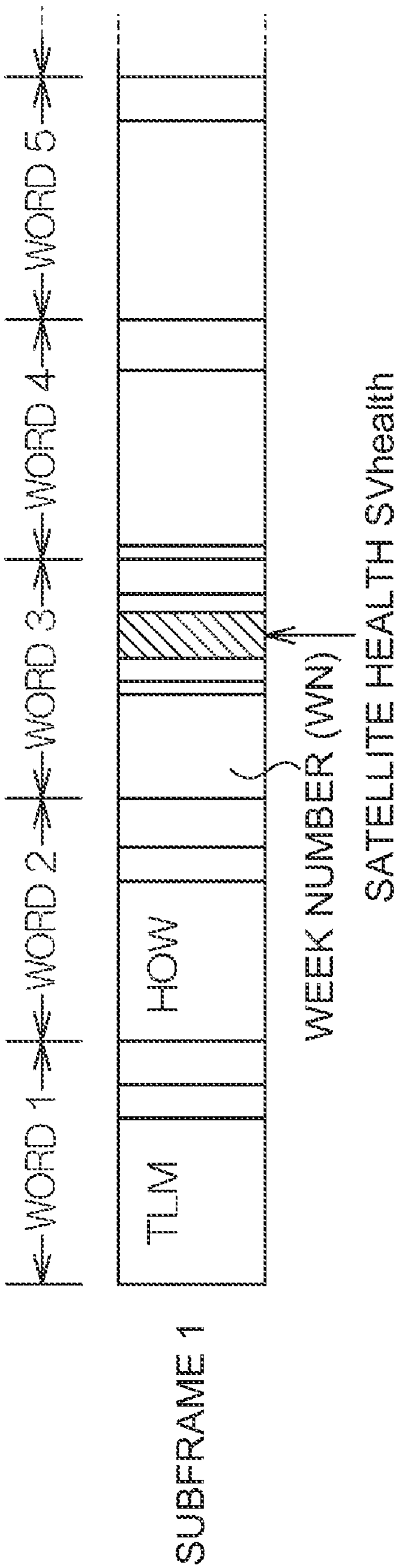
FIG. 11 shows the structure of word data in a subframe 1.

FIG. 11 schematically describes part of the word data (WORD 1 to WORD 5) in subframe 1.

As shown in FIG. 11, word 3 in subframe 1 contains the week number (WN) data and satellite health (SVhealth) data, which is a signal describing the operating condition of the GPS satellite 15*a* (15*b* to 15*d*).

Because the navigation messages from the GPS satellites 15*a* to 15*d* are transmitted as described above, receiving signals from the GPS satellite 15*a* (15*b* to 15*d*) in this embodiment of the invention means phase synchronization with the C/A code from the GPS satellite 15*a* (15*b* to 15*d*) affording the best reception conditions from among all of the GPS satellites 15*a* to 15*d*.

The C/A code (a 1023-chip pseudo random noise code that repeats every 1 ms) is used for synchronizing with 1 ms precision. The C/A code (1023 chip (1 ms) code) is different for each of the GPS satellites 15*a* (15*b* to 15*d*) orbiting the Earth, and is unique to a particular satellite.

Therefore, to receive the satellite signal from a particular GPS satellite 15*a* (15*b* to 15*d*), the receiver device 40 (reception unit) generates and phase synchronizes with the unique C/A code for the particular GPS satellite 15*a* (15*b* to 15*d*) in order to receive the satellite signal.

By synchronizing with the C/A code (1023 chips (1 ms)), the navigation message can be received, and the preamble of the TLM word and the HOW word of each subframe can be received, and the Z count data can be acquired from the HOW word. After acquiring the TLM word and the Z count (TOW) from the HOW word, the receiver device 40 can then acquire the week number (WN) data and the satellite health data SVhealth.

The satellite health data SVhealth enables determining the operating condition of the GPS satellite 15*a* (15*b* to 15*d*) being received as well as the other GPS satellites 15*a* (15*b* to 15*d*). Whether some problem has developed with the GPS satellite 15 or whether the satellite is a test satellite can be determined from this satellite health data SVhealth.

Whether the acquired Z count data can be trusted can be determined with a parity check. More specifically, the parity data following the Z count data of the HOW word can be used to verify if the received data is correct. If an error is detected by the parity check, there is something wrong with the Z count data and the Z count data is not used to correct the internal clock.

Returning to FIG. 9, if a satellite was captured in step ST17, control goes to step ST18. Step ST18 determines if the Z count data was acquired.

More specifically, the time data acquisition program 53 in FIG. 5 receives the navigation message from the GPS satellite 15*a* (15*b* to 15*d*) and acquires the Z count data. The Z count (TOW) data is then stored as the received satellite time information 71*a* in the received satellite time information storage unit 71 in FIG. 7.

The time information matching program 501 in FIG. 5 (an example of a decision unit) then determines if the received satellite time information 71*a* in FIG. 7 (an example of satellite-time-related information), that is, the acquired Z count data, can be trusted.

More specifically, the time information matching program 501 in FIG. 5 verifies whether the received data is correct based on the parity data following the Z count data in the HOW word. If an error is detected by the parity check, there is some sort of problem with the acquired Z count data and the Z count data is therefore not used to correct the internal clock.

As a result, if an error is detected the time data acquisition program 53 in FIG. 5 determines that the Z count data was not acquired and control goes to step ST14 in FIG. 8.

However, if in step ST18 the time information matching program 501 in FIG. 5 does not detect an error, the time data acquisition program 53 in FIG. 5 determines that the acquired Z count data can be used to correct the time, and stores the received satellite time information 71*a* in the received satellite time information storage unit 71 as the first reception time data 73*a*1 (an example of correction time information) of the reception time data 73*a* (an example of correction time information) in the time data storage unit 73 (an example of a correction time information storage unit). The Z count data is thus determined to have been acquired and control goes to step ST19.

Step ST19 then acquires the satellite health data SVhealth described above.

More specifically, the other satellite information acquisition program 55 in FIG. 5 gets the satellite health data SVhealth contained in word 3 of subframe 1. The other satellite information acquisition program 55 in FIG. 5 then stores the acquired satellite health data as the satellite health information 72*a* (an example of satellite health information) in the satellite health information storage unit 72 in FIG. 7.

Control then goes to step ST20 to determine if the satellite health information 72*a* in FIG. 7 indicates that the GPS satellite 15*a* (15*b* to 15*d*) is functioning correctly. More specifically, the satellite health confirmation program 56 (an example of a condition evaluation unit) evaluates the operating condition of the GPS satellite 15*a* (15*b* to 15*d*) based on the satellite health information 72*a*.

If the satellite health information 72*a* is a code value other than 0, the satellite health information 72*a* indicates some problem and the receiver knows that the GPS satellite 15*a* (15*b* to 15*d*) cannot be used. If the satellite is healthy, the satellite health information 72*a* is a code value of 0, and the receiver knows that the GPS satellite 15*a* (15*b* to 15*d*) is functioning correctly.

The GPS wristwatch 10 can therefore determine if the navigation message from the GPS satellite 15*a* (15*b* to 15*d*) can be trusted.

If in step ST20 the satellite health information 72*a* in FIG. 7 indicates a problem with the GPS satellite 15*a* (15*b* to 15*d*), control goes to step ST21.

In step ST21, the stop reception determination program 57 in FIG. 5 pauses reception by the receiver device 40. The change-received-satellite program 59 in FIG. 5 then stores the change-received-satellite synchronization information 74*a* in the change-received-satellite synchronization information storage unit 74 in FIG. 7 to change the GPS satellite 15*a* (15*b* to 15*d*) from which signals are received.

Control then returns to step ST13, and reception of signals from another GPS satellite 15*a* (15*b* to 15*d*) starts based on this change-received-satellite synchronization information 74*a*.

As a result, if there is a problem with the GPS satellite 15*a* (15*b* to 15*d*), the GPS wristwatch 10 can receive the navigation message from a different GPS satellite 15*a* (15*b* to 15*d*) from which the signals can be received normally, and the time can be reliably corrected with high precision.

If in step ST20 the satellite health information 72*a* indicates that the GPS satellite 15*a* (15*b* to 15*d*) is functioning normally, control goes to step ST22.

Whether there is a match with the internal time information is determined in step ST22. More specifically, the threshold offset determination program 503 in FIG. 5 determines if the offset between the internal time data 73*b* in FIG. 7, which is the current time, and the first reception time data 73*a*1 of the reception time data 73*a* is equal to the match verification threshold value 62*a* (an example of a threshold value offset) of the match verification threshold value storage unit 62 in FIG. 6. The match verification threshold value 62*a* is approximately 0.5 second per day in this embodiment of the invention.

If a match is not confirmed in step ST22, control goes to step ST23.

The internal time data 73*b* in FIG. 7 depends upon the performance of the real-time clock 38 that generates the internal time data 73*b*. The internal time data 73*b* is affected by the frequency shift (also referred to below as the frequency shift of the real-time clock 38) of the crystal oscillator connected to the control unit 20 that provides the reference clock of the real-time clock 38.

Therefore, if for some reason the frequency shift of the real-time clock 38 increases and the offset between the internal time data 73*b* and the first reception time data 73*a*1 in FIG. 7 becomes greater than the match verification threshold value 62*a* in FIG. 6, the data does not match and control goes to step ST23.

In step ST23 the time data acquisition program 53 in FIG. 5 gets the Z count data from subframe 2 and subframe 3, which are the next subframes received from the GPS satellite 15*a* (15*b* to 15*d*) after the Z count data from subframe 1 is acquired. The Z count data from subframe 2 and the Z count data from subframe 3 are then stored to the second reception time data 73*a*2 (an example of correction time information) and third reception time data 73*a*3 (an example of correction time information), respectively, of the reception time data 73*a* in the time data storage unit 73 in FIG. 7. Note that the time information matching program 501 in FIG. 5 described above of the GPS wristwatch 10 runs a parity check to determine if the acquired Z count data is correct.

Step ST24 then selects the Z count data for which two or more matches were confirmed from among the Z count data acquired from subframe 1, subframe 2, and subframe 3. That is, the reception time matching program 505 in FIG. 5 compares the first reception time data 73*a*1, the second reception time data 73*a*2, and the third reception time data 73*a*3 constituting the reception time data 73*a* in the time data storage unit 73 in FIG. 7.

If the difference between the data (Z count data) is substantially equal to the expected offset between the subframe data, the data is determined to match, and the reception time data 73*a* for which the match was confirmed is used. More specifically, the subframe data is transmitted in 6-second units, and the Z count data therefore normally differs by 6 seconds from one subframe to the next.

The reception time matching program 505 therefore determines if the difference between the first reception time data 73*a*1 and the second reception time data 73*a*2 is 6 seconds, if the difference between the second reception time data 73*a*2 and the third reception time data 73*a*3 is 6 seconds, and if the difference between the first reception time data 73*a*1 and the third reception time data 73*a*3 is 12 seconds.

Control then goes to step ST25. Step ST23 therefore does not determine if the reception time data 73*a* and the internal time data 73*b* match.

If a match is confirmed in step ST22, control goes to step ST25. In step ST25 the stop reception determination program 57 in FIG. 5 stops the reception operation of the receiver device 40, and ends receiving the navigation message from the GPS satellite 15*a* (15*b* to 15*d*).

Control then goes to step ST26 where the time information adjustment program 502 in FIG. 5 adjusts the internal time data 73*b* in FIG. 7 based on the reception time data 73*a*.

When the reception time data 73*a* matches the internal time data 73*b* in step ST22, the first reception time data 73*a*1 of the reception time data 73*a* is used. If a match with the internal time data 73*b* is not confirmed in step ST22, the reception time data 73*a* that was used is used in step ST24 is used.

The time information adjustment program 502 in FIG. 5 saves the corrected time as the time data for timepiece display 73*c* in FIG. 7.

The adjust display time data program 504 in FIG. 5 then corrects the time displayed by the display 14 and the hands 13 on the dial 12 of the GPS wristwatch 10 based on the time data for timepiece display 73*c* in FIG. 7.

The GPS wristwatch 10 thus corrects the time as described above.

Figures 12A, 12B:
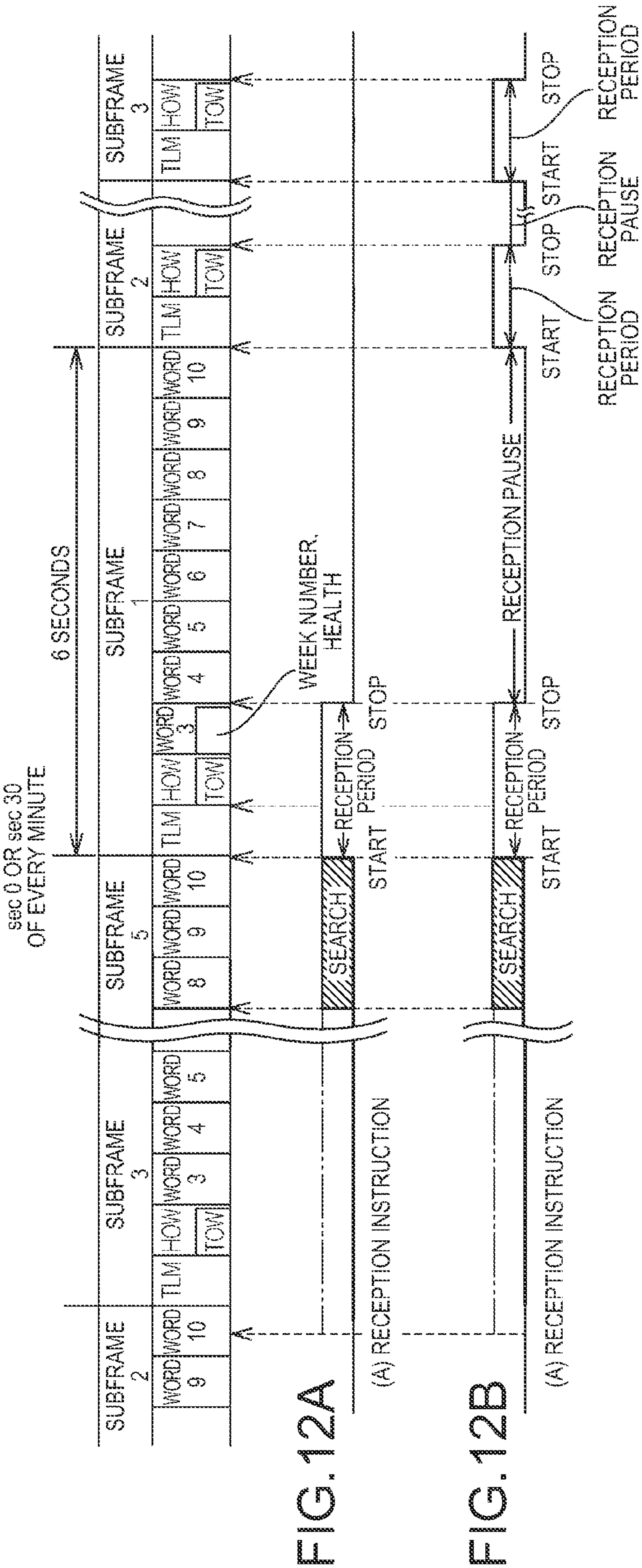
FIGS. 12A and 12B show the time sequence of the navigation message reception period of the GPS wristwatch according to the first embodiment of the invention.

FIG. 12 is a timing chart describing the reception period when the receiver device 40 of the GPS wristwatch 10 receives a navigation message from the GPS satellite 15*a* (15*b* to 15*d*). As shown in FIG. 12, when a receive command is asserted at time (A), the user operates the external operating unit 5 and inputs a command to receive the navigation message from the GPS satellite 15*a* (15*b* to 15*d*). The GPS wristwatch 10 then drives the display 14 to notify the user that receiving the navigation message from a GPS satellite 15*a* (15*b* to 15*d*) will begin.

The receiver device 40 does not immediately start receiving the navigation message from the GPS satellite 15*a* (15*b* to 15*d*) at this time (specifically, word 10 in subframe 2) because the current time does not equal the preset time for starting reception (that is, 2 to 10 seconds before the 0 or 30 second of the minute).

The receiver device 40 therefore enters a standby mode until the preset timing for starting reception arrives. When the preset timing for starting reception arrives, the receiver device 40 starts receiving the navigation message from a GPS satellite 15*a* (15*b* to 15*d*). The receiver device 40 therefore does not execute the reception operation during this standby period. As a result, the GPS wristwatch 10 can suppress an increase in power consumption when adjusting the time.

Line (a) in FIG. 12 shows the reception pattern when a match with the internal time data 73*b* is confirmed in step ST22. Line (b) in FIG. 12 shows the reception pattern when a match with the internal time data 73*b* is not confirmed in step ST22.

As shown in FIG. 12(*a*), the receiver device 40 starts reception approximately 2 seconds (3 words) before subframe 1, and continues receiving from the TLM word to word 3 of subframe 1.

The receiver device 40 synchronizes with the C/A code of the GPS satellite 15*a* (15*b* to 15*d*) as a result of the satellite search. The receiver device 40 is therefore synchronized with the beginning of the TLM word in subframe 1 when reception starts, and can acquire the Z count data (TOW) from the HOW word following the TLM word, and the satellite health information from word 3.

The GPS wristwatch 10 thus shortens the reception time compared with when all words in subframe 1 are received. The GPS wristwatch 10 can also know the operating condition of the satellite from the satellite health information acquired from word 3 of subframe 1. The GPS wristwatch 10 can therefore accurately adjust the time after a short reception period.

In the case shown in (b) in FIG. 12, the receiver device 40 receives from the TLM word to word 3 of subframe 1, and then receives the TLM and HOW words in the following subframe 2 and subframe 3. Note that the receiver device 40 also receives the TLM word containing the preamble data in both subframes in order to synchronize reception of subframe 2 and subframe 3.

As shown in FIG. 12(*b*), the GPS wristwatch 10 initiates a reception pause in which reception is temporarily stopped starting 1.8 seconds (3 words) after starting to receive the TLM word in subframe 1. The GPS wristwatch 10 therefore reduces the amount of power supplied to the receiver device 40 during this reception pause and stops reception for the approximately 4.2 seconds of the remaining 7 words in subframe 1.

The GPS wristwatch 10 resumes reception after the reception pause ends, therefore increases the power supply to the receiver device 40, and acquires the TLM word and Z count data of the HOW word in subframe 2.

The GPS wristwatch 10 initiates another reception pause starting 1.2 seconds (2 words) after starting to receive the TLM word in subframe 2, reduces the power supplied to the receiver device 40 and stops reception for the approximately 4.8 seconds of the remaining 8 words in subframe 2.

The GPS wristwatch 10 again resumes reception after the reception pause ends, therefore increases the power supply to the receiver device 40, and acquires the TLM word and Z count data of the HOW word in subframe 3.

The GPS wristwatch 10 then ends reception 1.2 seconds (2 words) after starting to receive the TLM word from subframe 3.

By thus providing a reception pause in which reception is stopped temporarily when receiving the subframe data, the GPS wristwatch 10 shortens the actual reception time and receives signals efficiently. The GPS wristwatch 10 can therefore suppress the increase in power consumption when adjusting the time. The reception pause period is set appropriately by the stop reception determination program 57 and the start-reception data configuration program 58 in FIG. 5.

Note also that to allow for error in the real-time clock 38, for example, the timing when subframe data reception starts is set slightly earlier than the expected timing, and the timing when subframe data reception ends is set slightly later than the expected timing.

As described above, the GPS wristwatch 10 generates the reception instruction data 75*a* when the user operates the external operating unit 5 to apply a reception command to the receiver device 40, and based on the reception instruction data 75*a* the start-reception data configuration program 58 tells the receiver device 40 to start receiving and acquire the Z count data from subframe 1. This enables the GPS wristwatch 10 to adjust the time (correct the internal time data 73*b*) at a timing near when the user wants to adjust the time.

The GPS wristwatch 10 adjusts the time based on the reception time data 73*a*, which is the received satellite time information 71*a* determined by the time information matching program 501 to be correct, and can therefore adjust the time accurately.

The start-reception data configuration program 58 of the GPS wristwatch 10 tells the receiver device 40 when to receive the satellite signal in order to correct the internal time data 73*b* at a specific time based on the internal time data 73*b*. Based on the start reception data 76*a*, the reception timing determination program 51 of the GPS wristwatch 10 then determines the timing when reception starts. It is therefore easy to adjust the time kept by the GPS wristwatch 10 because the timing when the time is adjusted is predetermined to, for example, the timing of the 0 or 30 second of the minute.

Based on the result returned by the satellite health confirmation program 56, the change received satellite program 59 causes the receiver device 40 of the GPS wristwatch 10 to receive the navigation message from a different GPS satellite 15*a* (15*b* to 15*d*) than the GPS satellite 15*a* (15*b* to 15*d*) from which signals are currently being received.

This enables the GPS wristwatch 10 to adjust the internal time data 73*b* based on the Z count data in a navigation message from a healthy GPS satellite 15*a* (15*b* to 15*d*). The GPS wristwatch 10 can therefore reliably and accurately adjust the time.

If the first reception time data 73*a*1 is determined to be unreliable when correcting the internal time data 73*b*, the GPS wristwatch 10 can use the second reception time data 73*a*2 or third reception time data 73*a*3 to adjust the time, and can therefore prevent the internal time data 73*b* from deviating even more from the correct time.

Embodiment 2

A GPS wristwatch 10*a* according to a second embodiment of the invention is substantially identical to the first embodiment described above, like parts are therefore identified by the same reference numerals and the following description focuses on the differences between the embodiments.

More specifically, the GPS wristwatch 10*a* according to this embodiment of the invention has the same configuration as the first embodiment described above and shown in FIG. 1 to FIG. 4 and FIG. 6.

Figure 13:
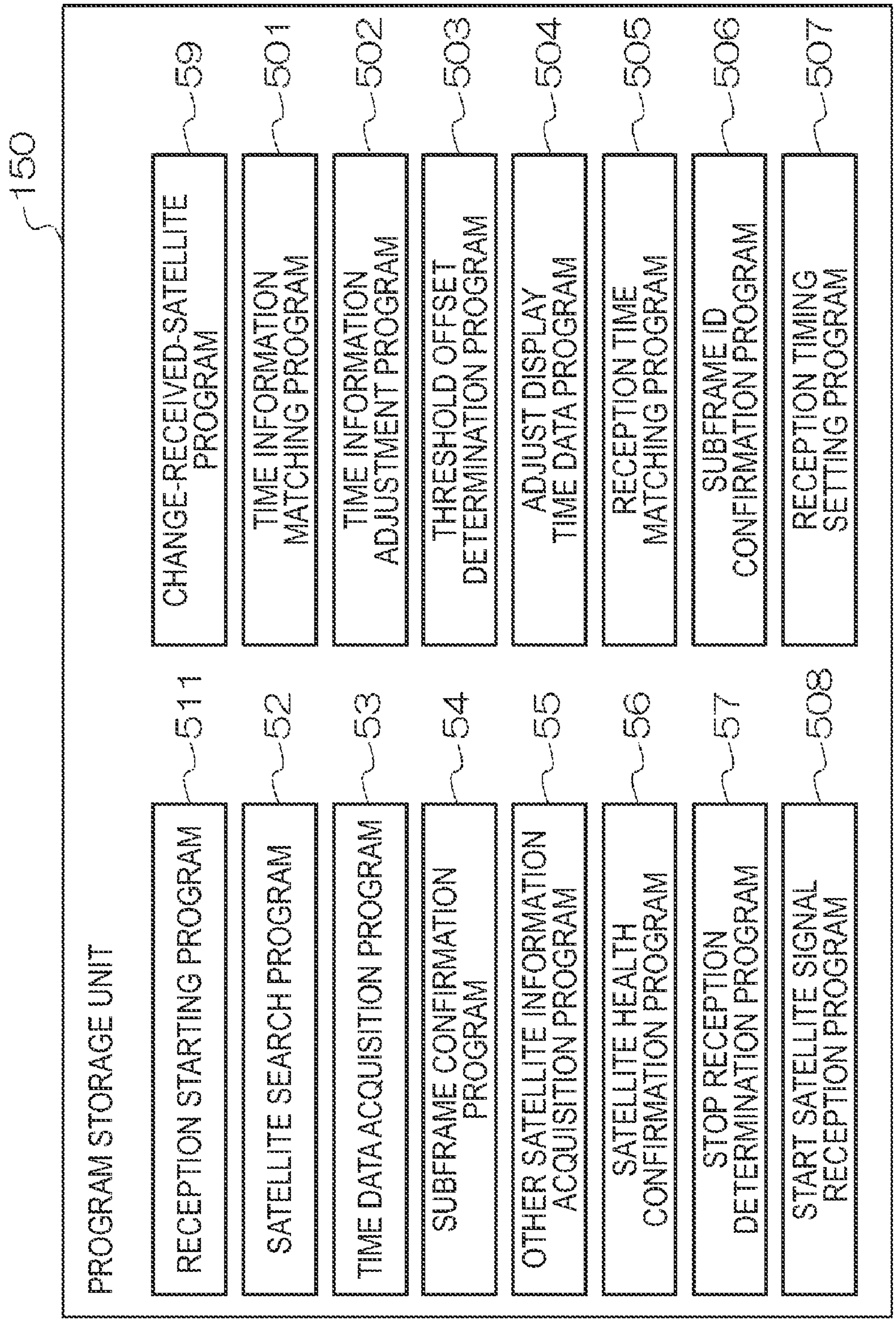
FIG. 13 shows data stored in the program storage unit of a GPS wristwatch according to a second embodiment of the invention.
Figure 14:
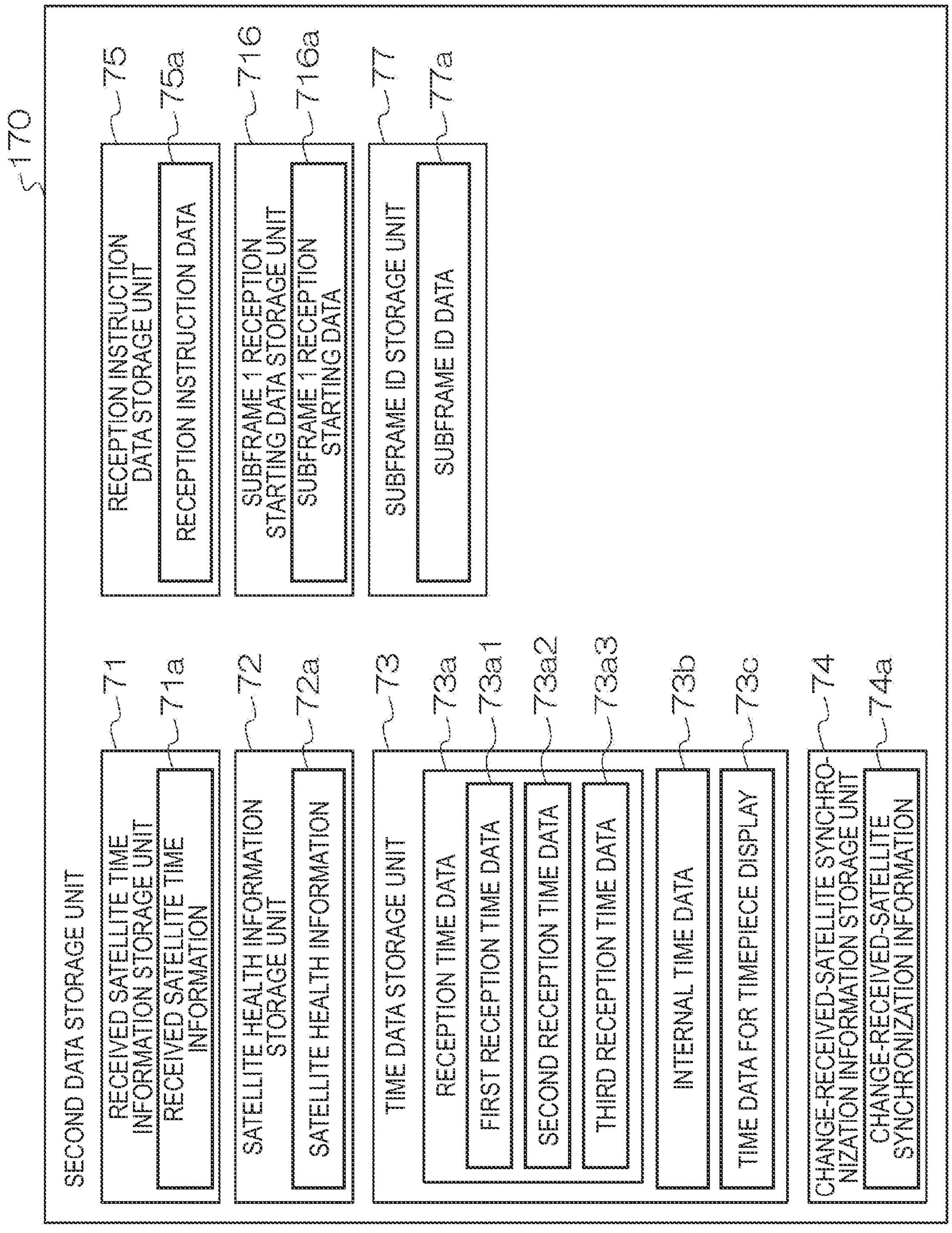
FIG. 14 shows data stored in the second data storage unit of a GPS wristwatch according to a second embodiment of the invention.
Figure 15:
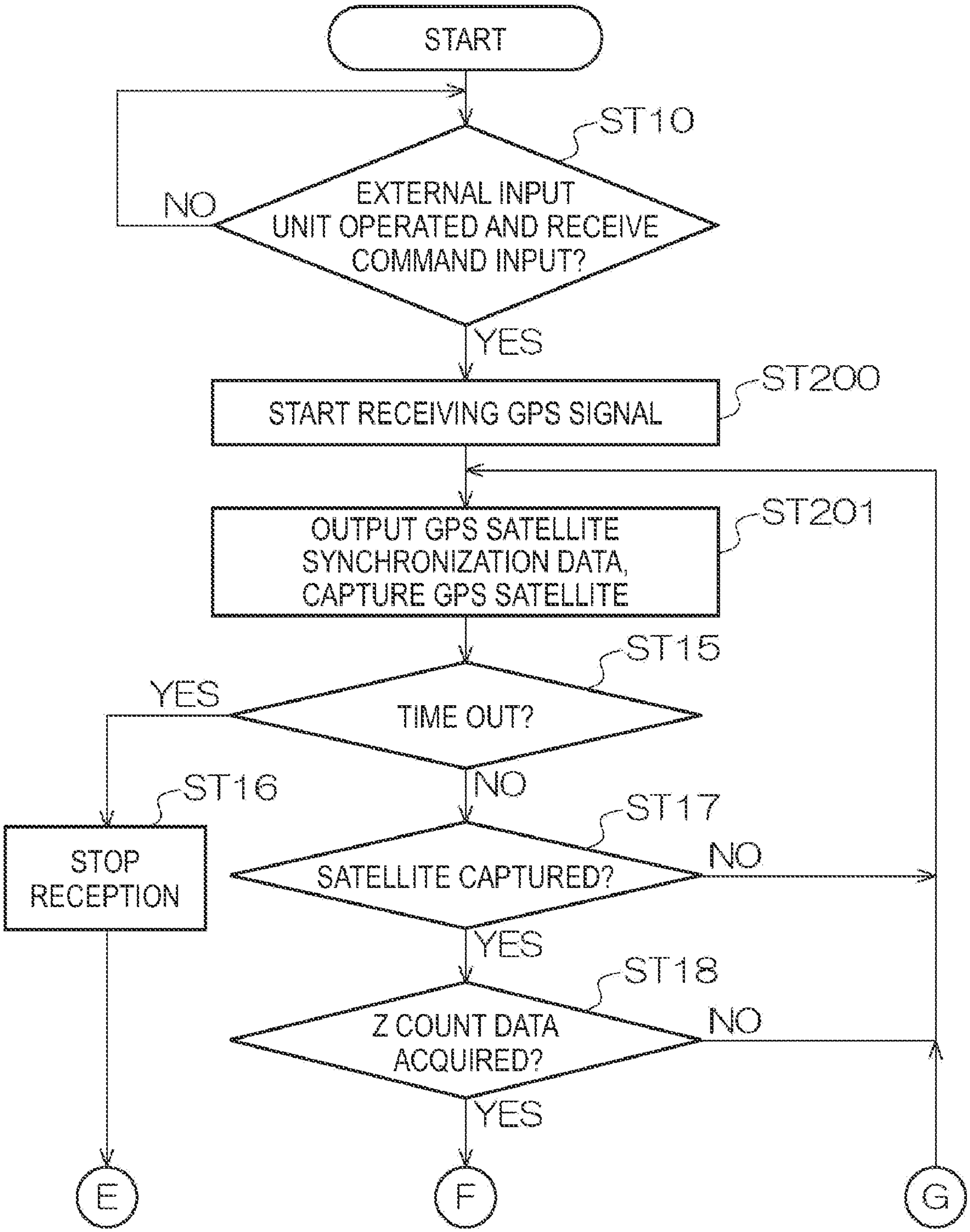
FIG. 15 is a flow chart showing the main steps in the operation of the GPS wristwatch according to the second embodiment of the invention.
Figure 16:
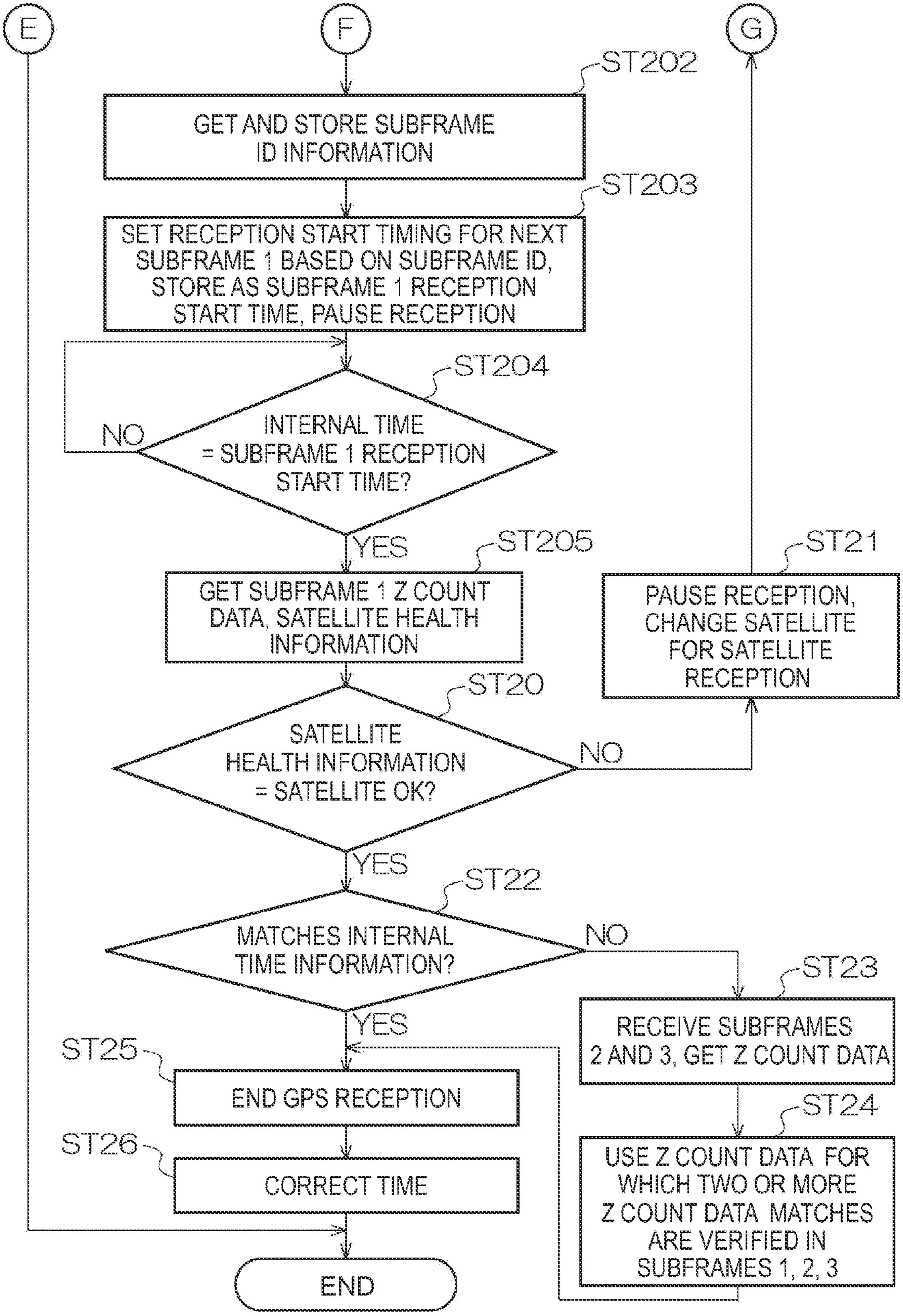
FIG. 16 is a flow chart showing the main steps in the operation of the GPS wristwatch according to the second embodiment of the invention.

FIG. 15 and FIG. 16 are flow charts describing the main steps in the operation of the GPS wristwatch 10*a* according to this second embodiment of the invention. FIG. 13 shows the programs stored in the program storage unit 150 of the GPS wristwatch 10*a*, and FIG. 14 shows the data stored in the second data storage unit 170.

Figure 17:
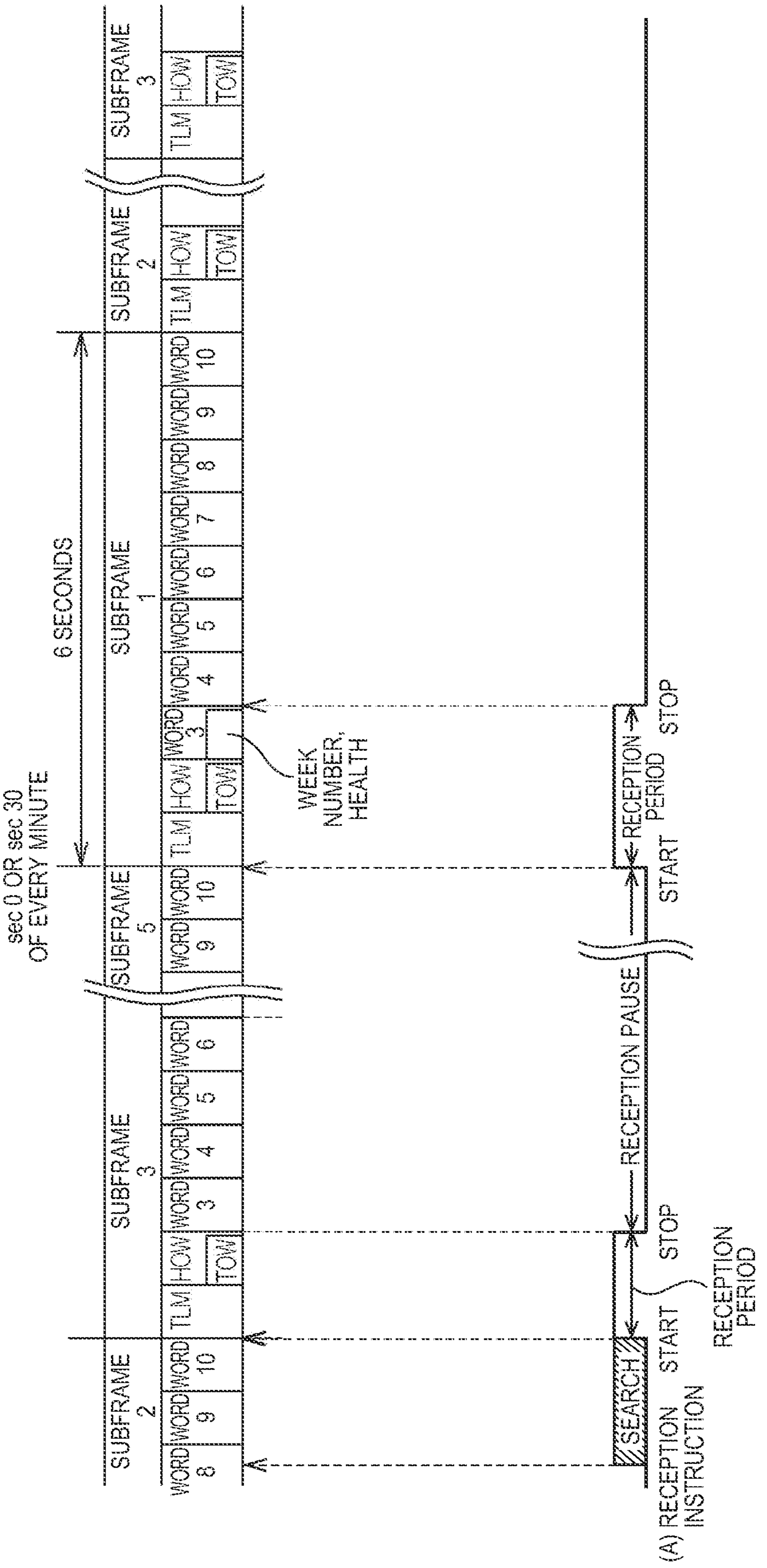
FIG. 17 shows the time sequence of the navigation message reception period of the GPS wristwatch according to the second embodiment of the invention.

FIG. 17 is a timing chart describing the reception period when the receiver device 40 of the GPS wristwatch 10*a* according to the second embodiment of the invention receives a navigation message from the GPS satellite 15*a* (15*b* to 15*d*).

As shown in FIG. 17, this embodiment of the invention immediately starts the GPS satellite 15*a* (15*b* to 15*d*) search when a receive command is asserted from the external operating unit 5 to receive the satellite signal.

The Z count data and subframe ID are acquired from the subframe data that is received first (see FIG. 10B). As described above, the subframe ID is information identifying the subframe from which the subframe data was received.

In this example, as shown in FIG. 17, the GPS wristwatch 10*a* knows from the subframe ID that the first received subframe data was from subframe 3. Because each subframe contains 10 words and each word is 0.6 second long, the GPS wristwatch 10*a* knows the timing when the Z count data from the next subframe 1 is transmitted once the subframe ID of the received subframe is known.

The GPS wristwatch 10*a* initiates a reception pause starting 1.2 seconds (2 words) after starting to receive the TLM word in subframe 3. The GPS wristwatch 10*a* therefore reduces the amount of power supplied to the receiver device 40 during this reception pause and stops reception for the approximately 16.8 seconds of the remaining 8 words in subframe 3, and all of subframe 4 and subframe 5.

The GPS wristwatch 10*a* then resumes reception after the reception pause ends, therefore increases the power supply to the receiver device 40, and acquires the TLM word, the Z count data of the HOW word, and the satellite health information in word 3 of the following subframe 1. The GPS wristwatch 10*a* then ends reception 1.8 seconds (3 words) after starting to receive the TLM word from subframe 1.

This method enables the GPS wristwatch 10*a* to receive the Z count data twice, and thereby adjust the time more accurately.

The operation of the GPS wristwatch 10*a* is described next with reference to FIG. 13 and FIG. 14 and the flow charts in FIG. 15 and FIG. 16.

Differing from the first embodiment, the GPS wristwatch 10*a* in this second embodiment of the invention starts signal reception from the GPS satellite 15*a* (15*b* to 15*d*) after step ST10, and executes steps (ST200, ST201) to capture a GPS satellite.

More specifically, as shown in FIG. 15, after the external operating unit 5 is operated, a reception command is asserted, and the reception instruction data 75*a* (command data) is stored in step ST10, the start satellite signal reception program 508 in FIG. 13 initiates signal reception from a GPS satellite 15*a* (15*b* to 15*d*) at the timing stored by the reception instruction data 75*a* (an example of immediate timing). Control then goes to step ST201 where the satellite search program 52 in FIG. 13 outputs GPS satellite 15*a* (15*b* to 15*d*) synchronization data, starts a GPS satellite 15*a* (15*b* to 15*d*) search, and captures a GPS satellite 15*a* (15*b* to 15*d*). Control then goes to steps ST15 to ST18, which are the same as described in the first embodiment and further description thereof is thus omitted here.

If step ST18 determines the Z count data was acquired, control goes to step ST202. In step ST202 the subframe ID confirmation program 506 in FIG. 13 acquires and stores the subframe ID following the Z count data as the subframe ID data 77*a* in FIG. 14 to the subframe ID storage unit 77. This enables knowing as described above that the acquired subframe data was from subframe 3.

If the Z count data cannot be acquired in step ST18, control returns to step ST201, but control could go to step ST202 to acquire the subframe ID.

Control then goes to step ST203. In step ST203 the reception timing setting program 507 in FIG. 13 (an example of a reception timing configuration unit) sets the timing for starting to receive the next subframe 1 based on the subframe ID data 77*a*, and stores the subframe 1 reception starting data 716*a* in the subframe 1 reception starting data storage unit 716.

In other words, if the subframe data was received from subframe 3, the timing when receiving the TLM word in the next subframe 1 starts is set to a time approximately 18.0 seconds (30 words) after receiving the TLM word in subframe 3 starts.

Reception pauses until this reception start time arrives.

Control then goes to step ST204. In step ST204 the reception starting program 511 determines if the internal time data 73*b* in FIG. 14 equals the subframe 1 reception starting data 716*a*.

If the internal time data 73*b* equals the subframe 1 reception starting data 716*a*, control goes to step ST205 and the time data acquisition program 53 and other satellite information acquisition program 55 in FIG. 13 acquire the subframe 1 Z count data and satellite health information.

Control then goes to step ST20. Steps ST20 to ST26 are the same as described in the first embodiment, and further description thereof is thus omitted here.

However, if the internal time data 73*b* in FIG. 14 has not reached the subframe 1 reception starting data 716*a*, operation pauses until the internal time data 73*b* in FIG. 14 equals the subframe 1 reception starting data 716*a*.

The GPS wristwatch 10*a* of this second embodiment of the invention can thus adjust the time more accurately because the Z count data is acquired twice.

The GPS wristwatch 10*a* can thus adjust the time more efficiently under circumstances such as described below.

If the time passed since the last time satellite signal reception succeeded is long and the internal time data 73*b* deviates greatly from the actual current time, the GPS wristwatch 10*a* could miss the reception timing for subframe 1.

In such cases the GPS wristwatch 10*a* immediately starts the reception operation when a command is applied from the external operating unit 5, synchronizes with the navigation message of the GPS satellite 15*a* (15*b* to 15*d*), acquires the subframe ID, acquires the Z count data from subframe 1, for example, and adjusts the time.

Because the precision of the real-time clock 38 that generates the internal time data 73*b* of the GPS wristwatch 10*a* is ±15 seconds/month, the time should be adjusted as described above if the signal has not been received for one month or more.

Embodiment 3

A GPS wristwatch 10*b* according to a third embodiment of the invention is substantially identical to the first embodiment described above, like parts are therefore identified by the same reference numerals and the following description focuses on the differences between the embodiments.

More specifically, the GPS wristwatch 10*b* according to this embodiment of the invention has the same configuration as the first embodiment as described above and shown in FIG. 1 to FIG. 4.

Figure 18:
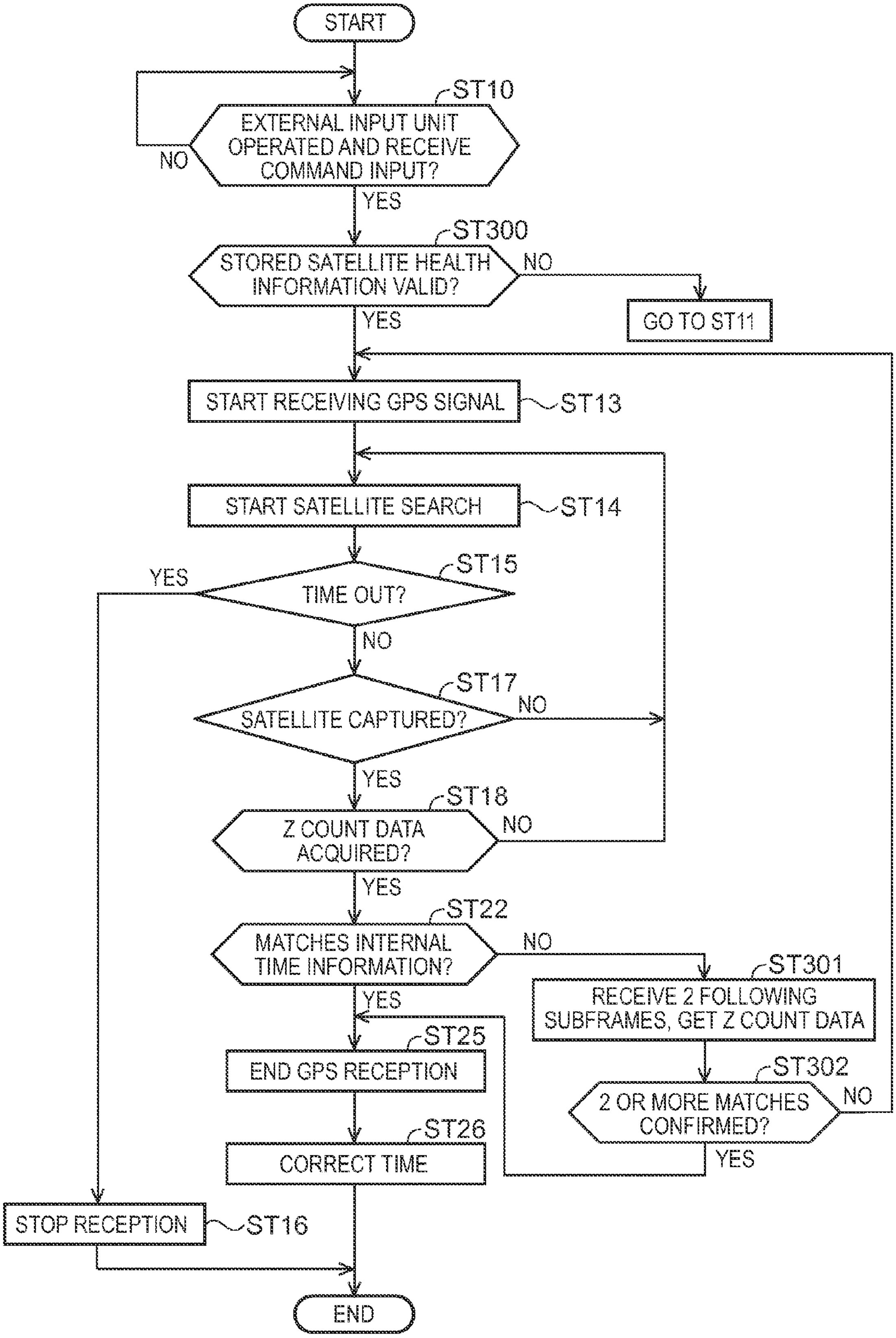
FIG. 18 is a flow chart showing the main steps in the operation of the GPS wristwatch according to a third embodiment of the invention.

FIG. 18 is a flow chart describing the main steps in the operation of the GPS wristwatch 10*b*.

When the time passed from when the previous navigation message was received and the satellite health information was acquired to the current time is greater than or equal to a predetermined time threshold, the GPS wristwatch 10*b* receives subframe 1 and acquires the Z count data and satellite health information.

If this elapsed time is less than the predetermined time threshold, the GPS wristwatch 10*b* receives the subframe data and acquires the Z count data regardless of the subframe ID number.

The GPS wristwatch 10*b* therefore receives subframe 1 if the time passed from when the previous satellite health information was acquired to the present is greater than or equal to a predetermined time, and can confirm the operating condition of the GPS satellite 15*a* (15*b* to 15*d*) from the satellite health information. The GPS wristwatch 10*b* can therefore determine the reliability of the acquired Z count data and accurately correct the time.

If the time passed is less than the predetermined time, the GPS wristwatch 10*b* receives the closest subframe data and acquires the Z count data regardless of the subframe ID number, thereby shortening the reception time and adjusting the time quickly. The GPS wristwatch 10*b* can thereby suppress the increase in power consumption when adjusting the time.

The operation of the GPS wristwatch 10*b* is described next with reference to the flow chart in FIG. 18 and focusing on the differences with the first embodiment.

When the external operating unit 5 is operated and a receive command is asserted in step ST10, control goes to step ST300.

In step ST300, the validity of the stored satellite health information is determined. More particularly, the satellite health confirmation program 56 in FIG. 5 determines if the time from when the previous satellite health information was acquired and stored in the satellite health information storage unit 72 as the satellite health information 72*a* in FIG. 7 to the present time is greater than or equal to a predetermined time. This predetermined time is preferably approximately 24 hours if the accuracy of the GPS wristwatch 10*b* is ±15 seconds/month when the satellite signal is not received.

If the stored satellite health information is valid in step ST300, control goes to step ST13 and GPS satellite 15*a* (15*b* to 15*d*) signal reception starts. Operation in steps ST14 to ST18 and ST22 is the same as described above in the first embodiment, and further description thereof is omitted here.

If the stored satellite health information is not valid in step ST300, control goes to step ST11 and operation continues therefrom as described in the first embodiment.

If the acquired Z count data matches the internal time data 73*b* in FIG. 7 in step ST22, control goes to step ST25 and operation continues as described in the first embodiment. If the acquired Z count data does not match the internal time data 73*b* in FIG. 7 in step ST22, control goes to step ST301.

In step ST301 the subframe data in the two subframes following the subframe containing the Z count data acquired in step ST18 is received, and the Z count data is acquired from each of these two subframes.

Control then goes to step ST302. Step ST302 determines if there are two or more matches with the Z counts acquired in step ST18 and step ST301. This match is decided in the same way as in step ST24 in the first embodiment, and further description is therefore omitted here.

If two or more matches with the Z counts are confirmed in step ST302, control goes to step ST25 and operation continues as described in the first embodiment.

If two or more matches with the Z counts are not confirmed in step ST302, control returns to step ST13 and the above operation repeats.

The GPS wristwatch 10*b* according to the third embodiment of the invention thus accurately and quickly adjusts the time by appropriately selecting the subframe data to be received based on whether the time passed from when the previous satellite health information was received to the present time is greater than or equal to a predetermined time. In addition, because the GPS wristwatch 10*b* can adjust the time in a short time, the increase in power consumption when adjusting the time can be suppressed.

The invention is described above using a GPS satellite as an example of a positioning information satellite, but the positioning information satellite is not limited to a GPS satellite and the invention can be used with Global Navigation Satellite Systems (GNSS) such as Galileo and GLONASS, and other positioning information satellites that transmit satellite signals containing time information, including the SBAS and other geostationary or quasi-zenith satellite.

The foregoing embodiments are also described as determining in step ST10 whether a command was asserted by the external operating unit 5, but the invention is not so limited. Instead of using the external operating unit 5 in step ST10, for example, a tilt switch or gyrosensor can be built in to the GPS wristwatch, and whether a receive command has been asserted can be determined by sensing the amount of incline or the speed of the incline of the GPS wristwatch.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A time adjustment device comprising:

a time information generating unit that generates time information including internal time data and outputs the generated time information;

a reception unit that receives satellite signals transmitted sequentially from a positioning information satellite in subframe information units, each containing time-related information of the positioning information satellite ("satellite time-related information"), and at least one subframe information unit containing information pertaining to an operating status of the positioning information satellite ("satellite health information");

an external input unit that generates command information, through manual operation of an external operating unit, instructing the reception unit to enter reception mode;

a reception timing configuration unit that sets the start time of reception by the reception unit when in the reception mode, so that the subframe information unit containing the satellite health information can be acquired at a time determined by the internal time data; and a time adjustment information storage unit that stores the satellite time-related information as time adjustment information;

wherein the generated time information is adjusted based on the time adjustment information.

2. The time adjustment device described in claim 1, wherein:

the positioning information satellite is a GPS satellite;

the subframe information units comprise subframe 1 to subframe 5 that collectively constitute a satellite signal transmission unit;

the satellite health information is contained in subframe 1; and the reception unit receives the satellite time-related information and satellite health information in subframe 1.

3. The time adjustment device described in claim 1, wherein:

the reception unit comprises a decision unit that determines if the received satellite time-related information is correct; and the time adjustment information corresponds to the satellite time-related information determined by the decision unit to be correct.

4. The time adjustment device described in claim 3, wherein:

if a current time adjustment, which is the amount the generated time information was adjusted based on the time adjustment information, exceeds a threshold value offset, which is an offset time corresponding to the time passed from the generated time information the last time the generated time information was corrected, then the reception unit receives the satellite time-related information in sequential subframe information units and stores the so received satellite time-related information as the satellite time information for the respective subframe information units;

any two satellite time-related information values for which the difference therebetween matches the difference between the subframe information units containing the two satellite time information values is selected; and the generated time information is corrected based on the selected satellite time-related information.

5. The time adjustment device described in claim 2, wherein:

subframe 1 to subframe 5 each contain a subframe ID number;

the reception unit starts reception immediately when a receive command is asserted by the external input unit if the start timing of reception by the reception unit is set to start reception immediately;

the reception timing configuration unit sets the start time for receiving the next subframe based on the subframe ID number of the first subframe received by the reception unit, and controls the reception unit to pause reception until the start time for reception of the next subframe arrives and to resume reception when the start time for reception of the next subframe arrives; and the reception unit thereby receives the satellite time-related information and satellite health information from the next subframe.

6. The time adjustment device described in claim 1, wherein the reception unit:

is able to receive satellite signals from any of a plurality of positioning information satellites, comprises a condition evaluation unit that determines the operating conditions of the plurality of positioning information satellites based on the satellite health information, and receives the satellite signal from a particular positioning information satellite based on the result output by the condition evaluation unit.

7. The time adjustment device described in claim 1, wherein:

if the time since the last time the satellite health information was received is greater than or equal to a predetermined time, then the reception unit receives subframe 1 as the subframe information unit containing the satellite time-related information and satellite health information.

8. A timekeeping device comprising the time adjustment device of claim 1.

9. A time adjustment method comprising:

generating time information including internal time data and outputting the generated time information;

receiving, using a reception unit, satellite signals transmitted sequentially from a positioning information satellite in subframe information units, each containing time-related information of the positioning information satellite ("satellite time-related information"), and at least one subframe information unit containing information pertaining to an operating status of the positioning information satellite ("satellite health information")

generating command information, through manual operation of an external operating unit, instructing the reception unit to enter reception mode;

setting the start time of reception by the reception unit when in the reception mode, so that the subframe information unit containing the satellite health information can be acquired at a time determined by the internal time data;

storing the satellite time-related information as time adjustment information; and adjusting the generated time information based on the time adjustment information.

* * * * *